TIME DIVISION MULTIPLEX TELECOMMUNICATION SWITCHING SYSTEMS

Filed May 31, 1962 34 Sheets-Sheet 1

INVENTOR
THOMAS H. FLOWERS,
By Hall & Houghton
ATTORNEY

TIME DIVISION MULTIPLEX TELECOMMUNICATION SWITCHING SYSTEMS

Filed May 31, 1962

34 Sheets-Sheet 2

INVENTOR

THOMAS HAROLD FLOWERS

BY Hall & Houghton

ATTORNEY

Oct. 19, 1965 T. H. FLOWERS 3,213,202

TIME DIVISION MULTIPLEX TELECOMMUNICATION SWITCHING SYSTEMS

Filed May 31, 1962 34 Sheets-Sheet 3

INVENTOR
THOMAS H. FLOWERS
BY Hall & Houghton
ATTORNEY

INVENTOR

THOMAS H. FLOWERS

BY Hall & Houghton

ATTORNEY

INVENTOR
THOMAS H. FLOWERS,
BY Hall & Houghton
ATTORNEY

INVENTOR
THOMAS H. FLOWERS
BY Hall & Houghton
ATTORNEY

INVENTOR
THOMAS H. FLOWERS,
BY Hall & Houghton
ATTORNEY

INVENTOR
THOMAS H. FLOWERS.
BY Hall & Houghton
ATTORNEY.

TIME DIVISION MULTIPLEX TELECOMMUNICATION SWITCHING SYSTEMS

Filed May 31, 1962

INVENTOR
THOMAS H. FLOWERS
BY Hall & Houghton
ATTORNEY

TIME DIVISION MULTIPLEX TELECOMMUNICATION SWITCHING SYSTEMS

Filed May 31, 1962 34 Sheets-Sheet 10

INVENTOR
THOMAS H. FLOWERS
BY Hall & Houghton
ATTORNEY

INVENTOR
THOMAS H. FLOWERS
BY Hall & Houghton
ATTORNEY

INVENTOR
Thomas H. Flowers
By Hall & Houghton
ATTORNEY

Oct. 19, 1965 T. H. FLOWERS 3,213,202

TIME DIVISION MULTIPLEX TELECOMMUNICATION SWITCHING SYSTEMS

Filed May 31, 1962 34 Sheets-Sheet 13

INVENTOR
THOMAS H. FLOWERS
BY Hall & Houghton
ATTORNEY

Oct. 19, 1965 T. H. FLOWERS 3,213,202

TIME DIVISION MULTIPLEX TELECOMMUNICATION SWITCHING SYSTEMS

Filed May 31, 1962 34 Sheets-Sheet 14

INVENTOR

THOMAS H. FLOWERS

BY Hall & Houghton

ATTORNEY

INVENTOR
THOMAS H. FLOWERS
BY Hall + Houghton
ATTORNEY

Oct. 19, 1965 T. H. FLOWERS 3,213,202

TIME DIVISION MULTIPLEX TELECOMMUNICATION SWITCHING SYSTEMS

Filed May 31, 1962 34 Sheets-Sheet 16

INVENTOR
Thomas H. Flowers
BY Hall & Houghton
ATTORNEY

INVENTOR
THOMAS H. FLOWERS
BY Hall & Houghton
ATTORNEY.

Oct. 19, 1965 T. H. FLOWERS 3,213,202

TIME DIVISION MULTIPLEX TELECOMMUNICATION SWITCHING SYSTEMS

Filed May 31, 1962 34 Sheets-Sheet 18

INVENTOR
THOMAS H. FLOWERS
BY Hall & Houghton
ATTORNEY

INVENTOR
THOMAS H. FLOWERS
BY Hall + Houghton
ATTORNEY

INVENTOR
THOMAS H. FLOWERS
BY Hall & Houghton
ATTORNEY

INVENTOR
THOMAS H. FLOWERS
BY Hall & Houghton
ATTORNEY

TIME DIVISION MULTIPLEX TELECOMMUNICATION SWITCHING SYSTEMS

INVENTOR
THOMAS H. FLOWERS
BY [signature]
ATTORNEY

TIME DIVISION MULTIPLEX TELECOMMUNICATION SWITCHING SYSTEMS

INVENTOR

THOMAS H. FLOWERS

BY Hall & Hughes

ATTORNEY

Oct. 19, 1965 T. H. FLOWERS 3,213,202

TIME DIVISION MULTIPLEX TELECOMMUNICATION SWITCHING SYSTEMS

Filed May 31, 1962 34 Sheets-Sheet 24

INVENTOR

THOMAS H. FLOWERS

BY Hall & Houghton

ATTORNEY.

INVENTOR
THOMAS H. FLOWERS
By Hall & Houghton
ATTORNEY.

TIME DIVISION MULTIPLEX TELECOMMUNICATION SWITCHING SYSTEMS

Filed May 31, 1962 34 Sheets-Sheet 26

INVENTOR
THOMAS H. FLOWERS
BY Hall & Houghton
ATTORNEY.

INVENTOR
THOMAS H. FLOWERS
BY [signature]
ATTORNEY.

Oct. 19, 1965 T. H. FLOWERS 3,213,202

TIME DIVISION MULTIPLEX TELECOMMUNICATION SWITCHING SYSTEMS

Filed May 31, 1962 34 Sheets-Sheet 28

INVENTOR
THOMAS H. FLOWERS
BY Hall & Houghton
ATTORNEY

INVENTOR
THOMAS H. FLOWERS
BY Hall & Houghton
ATTORNEY

TIME DIVISION MULTIPLEX TELECOMMUNICATION SWITCHING SYSTEMS

Filed May 31, 1962 34 Sheets-Sheet 30

INVENTOR
THOMAS H. FLOWERS
By Hall & Houghton
ATTORNEY.

Oct. 19, 1965 T. H. FLOWERS 3,213,202

TIME DIVISION MULTIPLEX TELECOMMUNICATION SWITCHING SYSTEMS

Filed May 31, 1962 34 Sheets-Sheet 31

INVENTOR
THOMAS H. FLOWERS
BY Hall & Houghton
ATTORNEY.

Oct. 19, 1965 T. H. FLOWERS 3,213,202

TIME DIVISION MULTIPLEX TELECOMMUNICATION SWITCHING SYSTEMS

Filed May 31, 1962 34 Sheets-Sheet 32

INVENTOR
THOMAS H. FLOWERS
BY Hall + Houghton
ATTORNEY

INVENTOR
THOMAS H. FLOWERS
BY Hall & Houghton
ATTORNEY.

Oct. 19, 1965 T. H. FLOWERS 3,213,202

TIME DIVISION MULTIPLEX TELECOMMUNICATION SWITCHING SYSTEMS

Filed May 31, 1962 34 Sheets-Sheet 34

INVENTOR

THOMAS H. FLOWERS

BY Hall & Houghton

ATTORNEY.

United States Patent Office 3,213,202

Patented Oct. 19, 1965

3,213,202

TIME DIVISION MULTIPLEX TELECOMMUNICATION SWITCHING SYSTEMS

Thomas Harold Flowers, London, England, assignor to Her Majesty's Postmaster General, General Post Office, St. Martin's-le-Grand, London, England Filed May 31, 1962, Ser. No. 199,043
Claims priority, application Great Britain, June 1, 1961, 19,846/61
15 Claims. (Cl. 179—18)

This invention relates to time division multiplex telecommunication switching systems of the kind in which information is transmitted between different parts of the system by means of physical conductors. In particular, although not exclusively, the invention relates to time division multiplex telephone switching systems.

It is an object of the present invention to provide a time division multiplex switching system in which a localised failure of transmission highways available to a large number or all users of the system does not deny service to those users or seriously reduce the capacity of the system to transmit information.

According to the present invention a time diviison multiplex telecommunication system includes a plurality of bothway time division multiplex highways connectable by means of a co-ordinate switch having electronically controlled crosspoints to a further plurality of bothway time division multiplex highways in such manner that each of the first mentioned highways has access via the co-ordinate switch to at least two of the further highways.

One form of system embodying the invention includes a plurality of time division multiplex IN highways and a number of time divisions multiplex OUT highways connectable by means of a co-ordinate switch having electronically controlled crosspoints to a further plurality of IN and OUT time division multiplex highways in such manner that each IN highway has access via the co-ordinate switch to at least two of the further IN highways and each OUT highway has access via the co-ordinate switch to at least two of the further OUT highways.

Each time division multiplex channel on a highway is permanently allotted a single time position in a recurring cycle of time positions and all the highways are synchronised. The crosspoints are adapted to be operated cyclically at the time positions of the highway channels in order to place a channel on one IN highway in communication with a channel on a further IN highway, or a channel on one OUT highway in communication with a channel on a further OUT highway.

In the case of a telephone exchange switching system embodying the invention, subscribers sharing an IN highway and an OUT highway are permanently allotted different channels and connections between subscribers are effected via audio links which enable the requisite change of time positions to be brought about. Alternatively, links incorporating time delays can be used, the time delay being changed according to the relative time positions occupied by subscribers to be placed in communication. Subscribers are divided into groups each group comprising a number of subscribers each connected to different highways but all occupying the same time position on those highways.

A further subsidiary feature of the invention when embodied in a telephone exchange is that for purposes such as those known in the art as marking, setting up, holding, signalling and metering, there may be provided, in association with and corresponding to the pattern of highways and crosspoints utilised for the transmission of speech or other signals, further patterns of highways which may have crosspoints operated concurrently, except during the setting up of a call, with crosspoints in the speech transmission network or may be interconnected by unidirectional conducting elements at points corresponding to the transmission crosspoints.

By way of example only, a time division multiplex telephone exchange employing transmission by means of amplitude modulated pulses and embodying the invention will now be described in greater detail with reference to the accompanying drawings of which:

FIG. 1(*a*) shows in logical form connections between subscribers and highways,

FIG. 1(*b*) shows the exchange in block schematic form,

FIG. 2 shows, partly in logical form and partly schematically, the speech transmission trunking layout of the system, FIG. 3 shows in schematic form the connections between subscribers' highways and other highways, FIGS. 4(*a*) and 4(*b*) are waveforms of pulse trains used in an embodiment of the invention, FIGS. 5–30 assembled as shown in FIG. 31 constitute a circuit diagram of the exchange partly in logical form, and, FIG. 32 is a circuit diagram of a selector used in the embodiment shown in FIGS. 5–30.

*General description—Subscribers' line equipment*

FIG. 1(*a*) shows a plurality of subscribers lines 1 . . . 30 connected via exchange termination apparatus including hybrid transformers for 2–4 wire conversion to IN channels 101 . . . connected via transmit gates 201 . . . to IN highways 501 and via OUT channels 301 . . . and receive gates 401 . . . to OUT highways 601. The OUT channels include, as shown, the usual filters and amplifiers. The transmit and receive gates of each subscriber are joined to respective pulse leads P1 . . . P30 from pulse train sources (not shown) which enable the gates to be pulsed at a given time position in a recurring cycle of time positions.

For the purposes of illustration only, it is assumed that each highway has 30 subscribers joined to it and provides a maximum of 30 time division multiplex channels and that there are 34 IN and OUT highways giving 1020 subscribers.

For the purposes of pulsing the gates, the subscribers are considered to form a rectangular array of rows and columns, each row comprising the subscribers connected to the same IN and OUT highways and each column containing corresponding subscribers in each row.

Synchronous time cycles of 30 time positions P1 . . . P30 are used on all the highways and all subscribers of column 1 are pulsed at time P1, and all subscribers of column 2 at time P2 and so on, subscribers of column 30 being pulsed at time P30. Thus at time P1, the highways are available for use only by their respective subscribers in column 1 but at time P2 the highways are made available to the respective subscribers of column 2 and so on. For the purposes of this specification, each column of subscribers is subsequently referred to as a group of subscribers. As is well known, a pulse repetition frequency of at least twice that of the maximum speech frequency to be transmitted through the system must be used and in the present embodiment a pulse repetition frequency of 10 kc./s. is used and a pulse duration of 1/300,000 second.

*General description—Block schematic layout*

FIG. 1(*b*) shows in block schematic form the layout of the exchange. The drawing shows several rows of subscribers 1 . . . 30, the subscribers of each row being joined by their line equipments to IN and OUT time division multiplex highways common to the row and indicated in FIG. 1(*b*) by single lines, for example line 501, 601.

The IN and OUT highways of all the rows are connected by a co-ordinate array of electronically controlled crosspoint switches represented in FIG. 1(*b*) by block 8 to further IN and OUT time division multiplex highways indicated generally by numeral 10. The switch 8 permits access from each IN and OUT highway to at least two of the further IN and OUT highways respectively, the exact number being determined by traffic requirements.

Each of the further highways 10 has access by further co-ordinate arrays of electronically controlled crosspoint switches represented by blocks 11, 12 to at least two in each of a plurality of time diviison multiplex highways 13, 14 respectively. Switches 11 and 12 are similar in function to switch 8 and serve to segregate traffic on the highways 10. Originating traffic appears on highways 13 and terminating traffic on highways 14. Originating traffic is defined as traffic passing from a calling subscriber whilst terminating traffic is that passing to a called subscriber.

Terminatiing traffic arriving over incoming junctions 18 is routed to the highways 10 via co-ordinate arrays of electronically controlled crosspoint switches 15 and 17 whilst originating traffic to be routed over outgoing junctions 20 passes from highways 10 via switch 11 to highways 13 and then via a co-ordinate switch 19 to the outgoing junctions 20.

Both incoming and outgoing junctions include, in known manner, line equipment including pulse modulators, demodulators and amplifiers, such equipment being represented in FIG. 1(*b*) by blocks 21.

Highways 13 and 14 are linked for the purpose of local calls by audio links of which one, 22, is shown in FIG. 1(*b*). Access to the audio links is obtained via co-ordinate switches 23 and 24 as shown. Each audio link also has line equipment indicated by blocks 21.

For the purpose of setting up calls, registers and a marker are provided and are represented in FIG. 1(*b*) by blocks 27 and 28 respectively and are connected by co-ordinate switches 25 and 26 to the highways 10 and 14 respectively. In principle, the registers 27 might be time shared, but in the embodiment shown in FIG. 1(*b*), this technique is not used and a number of registers is shown each of which sets up one call at a time.

Supervisory equipment indicated by blocks 29 and 30 is provided in known manner for highways 13 and 14 respectively.

*General description—Trunking layout*

FIG. 2 shows two only of the 34 pairs of IN and OUT highways, those two being indicated by reference numeral 7. Each of the highways 7 has access via co-ordinate switch 8 having electronically operated crosspoints 9 to at least two of a plurality 10 of further time division multiplex highways and of which, IN highways are shown in full lines whilst OUT highways are shown in dotted lines. Each IN and OUT highway of the highways 7 has access respectively at at least two IN and OUT highways of the further highways 10, the exact number being determined by known methods based on expected traffic density, those methods also being used to determine the number of further highways required. Thus traffic from all 1020 exchange subscribers is concentrated by switch 8 on to the further highways 10.

Each of the further highways 10 has access by co-ordinate switches 11 and 12 to at last two in each of a plurality of time division multiplex highways 13 and 14 respectively.

Each of the highways 14 has access by a co-ordinate switch 15 to at least two time division multiplex highways 16 each of which has access via a co-ordinate switch 17 to a group 18 of incoming junctions. Switch 17 is represented by a symbol which is slightly different from that employed for switches 8, 11 and 12. The symbol used for example for switch 17 denotes a crosspoint operable at not more than one time position in a cycle of time positions, wherein the symbol used for example at 9 denotes a crosspoint which may be operated at more than one time position in a cycle. Switch 15 provides greater availability between the incoming junctions 18 and the highways 14.

Similarly highways 13 are connected via co-ordinate switch 19 to outgoing junctions 20. Switch 19 operates in a manner similar to that of switch 17. Both incoming and outgoing junctions include pulse demodulators and amplifiers of known form which are represented in FIG. 2 by blocks 21.

Highways 13 and 14 are interconnected by a plurality of audio links 22 joined to the highways by co-ordinate switches 23 and 24 respectively which function, for IN highways to gate channels on those highways on to selected audio links, and for OUT highways to produce modulated pulses on selected channels of the OUT highways.

In association with some or all of the highways provided for the transmission of speech signals through the exchange as already described, there are provided an additional path or a plurality of additional paths for some or all of the following purpose:

Marking
Setting-up
Holding
Signalling
Metering

In general, these paths are interconnected by crosspoints corresponding to and operated concurrently with the speech transmission crosspoints, but additional paths concerned with marking may be interconnected by other suitable means such as diodes at points corresponding to the speech transmission crosspoints.

As indicated in FIG. 2, switches 25 and 26 give access from the highways 10 and highways 14 respectively to a plurality of originating registers and terminating registers indicated by block 27. While in principle the registers could be time-shared, the saving obtained by reducing the number of registers may be outweighed by increased complexity of individual registers. Each register may therefore deal with one call at a time.

A single marker and a single translator indicated by block 28 are associated with any register when required.

Each highway 13 has permanently associated with it an originating supervisory unit 29 and each highway 14 is permanently associated with a terminating supervisory unit 30. Logical functions in the supervisory units are time-shared.

Associated with each co-ordinate switch is a store, for example a ferrite store, which may be set to generate pulses to operate the crosspoints of the switch at the appropriate times. The state of the crosspoints is changed at each pulse time in accordance with the requirements at that pulse time. Thus at pulse time P1, crosspoints are operated in accordance with the needs of traffic originating or terminating with the first group of subscribers whilst at pulse time P2, crosspoints are operated in accordance with the needs of the second group of subscribers and so on.

*General description—Summary of operation*

Calling subscribers are detected by scanning, that is to say, by sequential examination of the condition of the subscribers lines. It is an advantageous feature in an exchange in accordance with the invention that scanning can be effected by observation of the IN highways since the conditions of the 30 subscribers' lines connected thereto are presented in turn on each of the highways. At the time position allocated to each subscriber, the condition in which the subscriber's loop is broken is characterized by the absence of a pulse, and the condition in which the loop is completed by the presence of a pulse. In the embodiment described, the scanning apparatus is associated with one highway for the duration of one cycle, during which the conditions of 30 subscribers' lines are examined, and is then transferred to another highway to examine 30 other lines, and so on for a total of 34 cycles to cover all the subscribers, after which the process is repeated.

A calling subscriber is thus detected by the presence on the IN highway to which he is connected of a pulse at the characteristic pulse time of the subscriber. Detection of a calling subscriber's pulse enables a connection to be set up between a free originating register and the subscriber, over one of the highways on which the subscriber's channel pulse time is free. Dialing tone can then be returned to the calling subscriber who dials the designation of a wanted subscriber to the originating register, as a result of which the marker marks the wanted subscriber. When both subscribers are in the same exchange stores associated with coordinate switches containing the operated crosspoints are set to operate at the calling subscriber's pulse time, i.e. in switches 8, 11 and 23 and at the called subscriber's pulse time in switches 8, 12 and 24.

Thus, speech passes from the calling subscriber via switches 8, 11 and 23 to a selected audio link and thence via switches 24, 12 and 8 to the called subscriber. Speech from the called subscriber passes via switches 8, 12 and 24, the selected audio link and then switches 23, 11 and 8 to the calling subscriber.

Calls to and from subscribers in other exchanges are effected via the outgoing and incoming junctions, the associated switches being operated at the appropriate pulse times.

*General description—Co-ordinate switch layout*

The co-ordinate switches comprise cross-points which are expensive and it is therefore important economically that the minimum number should be used. This means choosing for each switch a pattern of cross-points which in general does not have a cross-point at each co-ordinate point of the switch. In order to be able to use the most advantageous pattern it is desirable to be able to use any pattern and it is a feature of the invention that any pattern may be used at each of the co-ordinate switching points. FIGURE 3 shows as an example a suitable cross-point pattern for the co-ordinate switch 8 of FIGURE 2 assuming 34 highways 7, having an availability of 5 out of eight highways 10. The number of combinations of eight highways five at at time is 56, hence, each of the 34 highways 7 can have access to a unique combination of five of the eight highways 10 which is the case in FIGURE 3. The traffic to and from the subscribers' lines on highways 7 is then mixed on the highways 10 in the most advantageous manner from the point of view of distribution and grade of service.

*Detailed description—pulse diagrams*

Figure 1A:
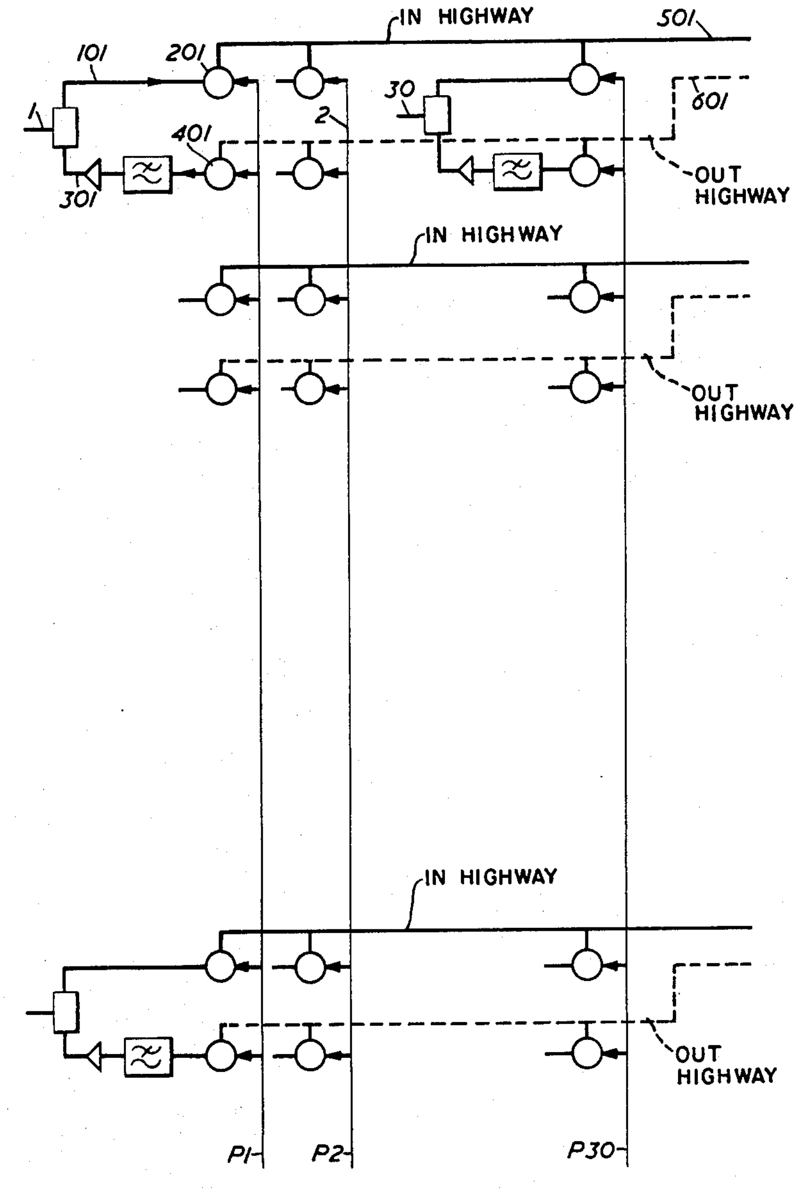
Figure 1B:
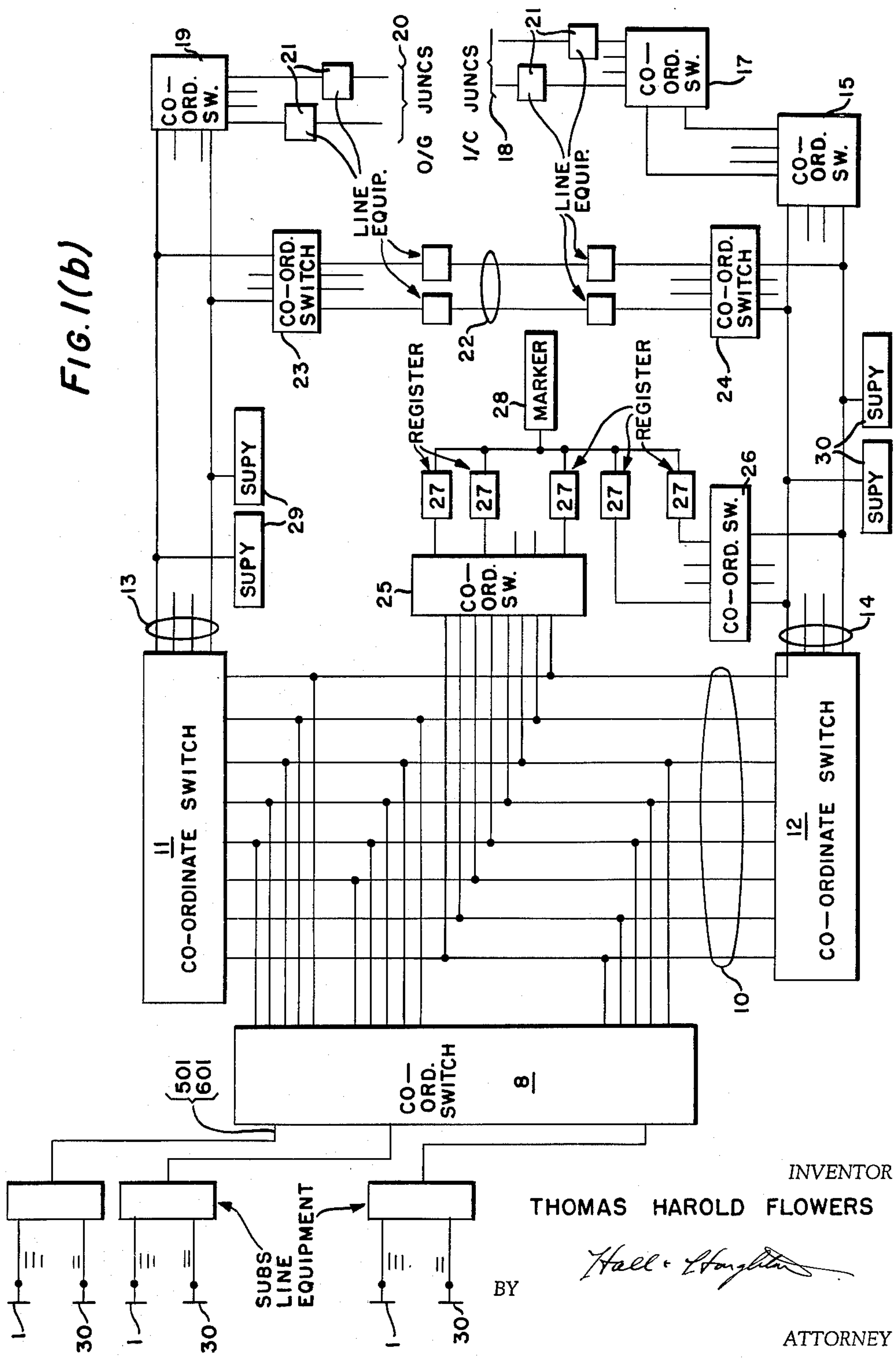
Figure 4:
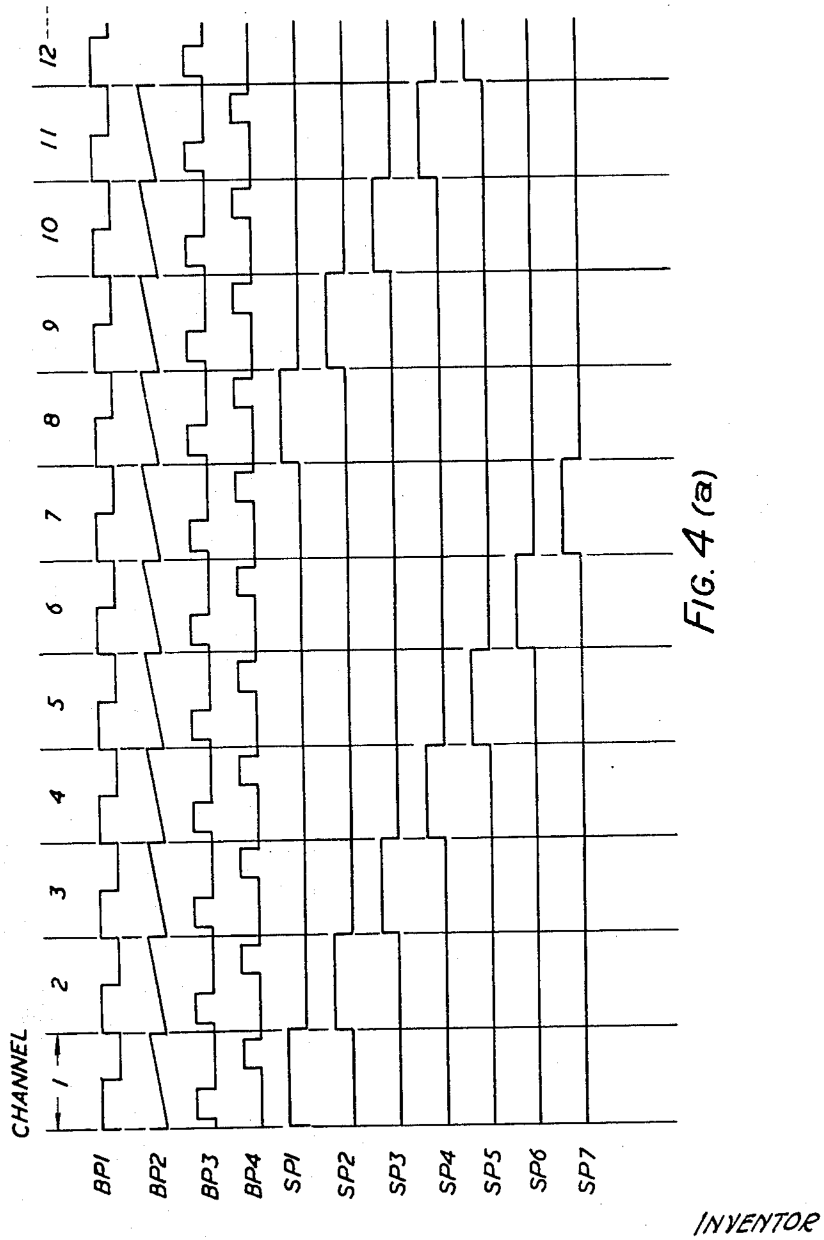
Figure 4:
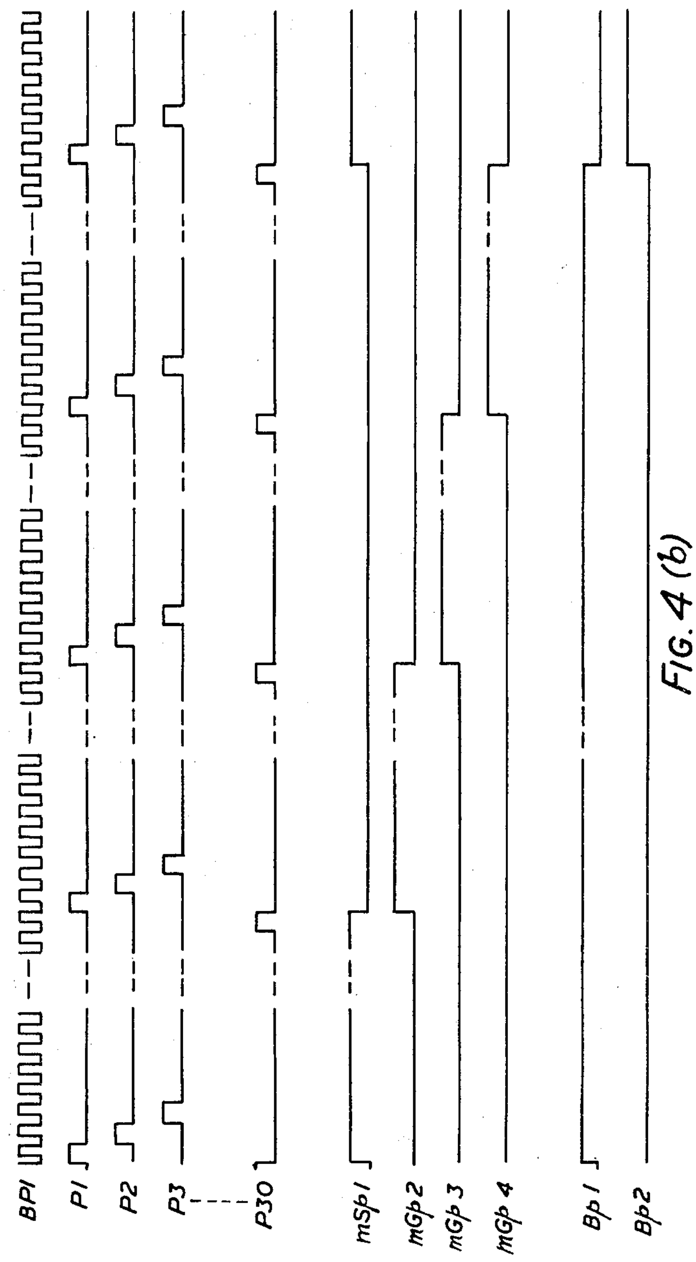

Referring now to FIGURES 4(*a*) and (*b*) a first series of basic frequency pulses BP is illustrated, these pulses occurring once in each channel time in the multiplex i.e. every 3⅓ microsecond for a 30-channel system at 10 kc./s. channel pulse repetition frequency. Waveform BP1 is a rectangular wave of alternate positive and negative pulses of equal duration and is the datum timing for the whole system. BP2 is a saw tooth wave, and BP3 and BP4 are rectangular pulses within the positive and negative pulse times of BP1. In use those pulses are sometimes required with the opposite polarity to that shown in FIGURES 4(*a*) and (*b*). This is indicated in the text and on the drawings by the addition of a prime to the designation e.g. BP1 means the BP1 waveform with negative and positive pulses where positive and negative are shown in FIGURE 4(*a*). A second series of pulses S*p* is obtained by division of the basic pulses BP1 by a factor *n* to produce *n* trains of pulses having a cycle time of *n* pulse time. In FIGURE 4(*a*) it is assumed that the division factor is 7. For these pulses, often called vernier pulses, the division factor has to be prime relative to the number of channel pulses in the multiplex and in this example 7 is prime to 30 and a suitable number as will transpire later in this sepcification. A third series of pulses P drawn in FIGURE 4(*b*) to a smaller scale than FIGURE 4(*a*) are fixed channel pulses and comprise pulses having the duration of a multiplex channel i.e. 3⅓ micro in this example derived from and therefore substantially coincident with the BP1 pulses, of repetitive time equal to the multiplex cycle time, i.e. 30 channel pulses in this example. There is thus a P pulse train for each channel in the multiplex (as shown in FIGURE 1). A fourth series of pulses are multiplex group pulses *m*G*p* each spanning one multiplex cycle of pulses from P1 to P*n* there being *m* such pulses where *m* is at least equal to the number of multiplex highways or some convenient sub-multiple thereof to which subscribers' lines are connected (highways 7 in FIGURE 2). A fifth series of pulses B*p* are block pulses each spanning one cycle of *m*G*p* pulses having a pulse repetition frequency of *e* such cycles where *e* is not less than 2 and varies with the size of the exchange in a manner which will be clearer later in this description. The pulses described with reference to FIGURES 4(*a*) and (*b*) can be produced by known means.

*Detailed description—subscriber's line equipment*

Figure 5:
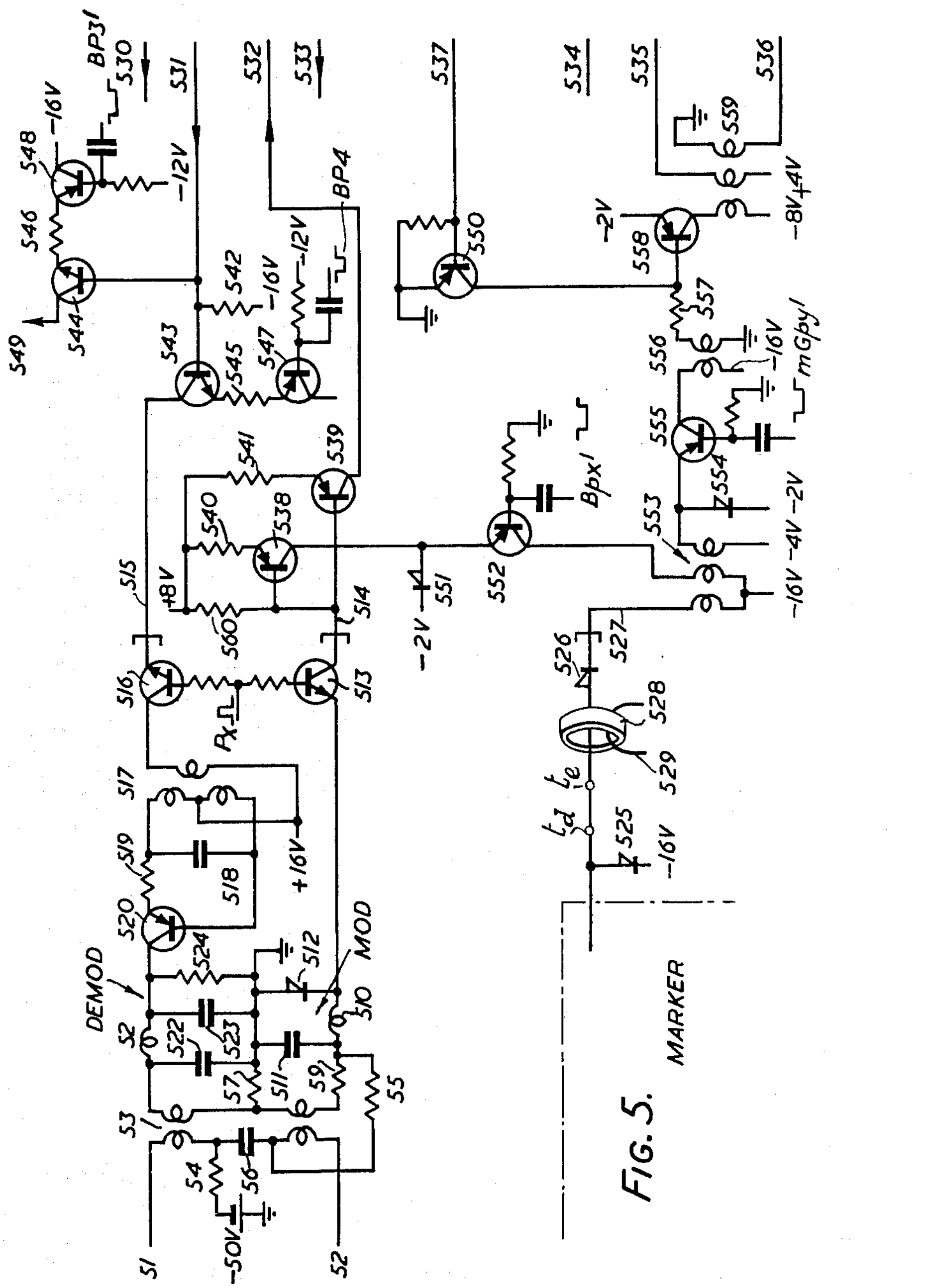

Turning now to FIGURE 5, the two conductors of a subscriber's line are terminated at 51 and 52 on line equipment which provides feeding current on the line, and multiplex modulation and demodulation of a fixed pulse P*x*. A.C. signals from a supervisory to the line are assumed for calling the stations e.g. by operating a tone sounder. The conductors 51 and 52 terminate on the primary of a hybrid transformer 53, the primary being split and including a capacitor 56 at its centre with feed resistors 54 and 55 respectively to the exchange battery assumed —50 v. and earth via a modulator. The secondary of the hybrid transformer is in two parts not necessarily equal with a balance network shown in FIGURE 5 as a resistor 57 connected between the junction of the two parts and earth. The transmit half of the winding is connected by a resistor 59 to the modulator which thus receives D.C. line current via resistor 55 and audio frequency current via resistor 59. The modulator (MOD) comprises a series inductor 510 and shunt capacitor 511 and diode 512 connected to earth. Further, in series with the inductor is a transistor 513 which is normally nonconducting, hence the currents via resistors 55 and 59 normally flow into the modulator. The D.C. via resistor 59 flows wholly in the inductor and diode and most of the A.C. via resistor 59 also flows in the inductor and diode because the resonant frequency of the modulator is arranged to be above that of the highest audio frequency to be transmitted. The transistor 513 is shown as type npn and pulsed on its base via a resistor which causes it to conduct during the multiplex channel pulse time P*x*, the polarities and amplitudes being such that the diode 512 is rendered non-conducting and the current in the inductor 510 at that time is caused to flow in the emitter circuit of the transistor for the duration of the pulse. Hence the current in the collector circuit is a pulse amplitude modulated version of the line current on which is superimposed audio currents to be transmitted into the exchange. The collectors of the transistors 513 of all the lines in a multiplex group are commoned to a transmit highway (e.g. 501 in FIGURE 1) designated 514. The corresponding receive highway 515 (e.g. 601 in FIGURE 1) is commoned to the emitters of npn transistors 516 one for each subscriber's line and multiplex channel, each transistor being pulsed on its base via a resistor by the same pulse source P*x* as its associated transmit channel. An amplitude modulated pulse train appearing on highway 515 at channel times P$x$ is gated into the line circuit and demodulated to D.C. and audio frequency by a demodulator (DEMOD) which comprises (1) a transformer 517 receiving in its primary winding the amplitude modulated current pulses from the transistor 516, and having a capacitor 518 shunting its secondary winding and forming with the inductance of the secondary winding a resonant circuit of natural period twice the duration of the received pulses, the energy of the resonant circuit discharging between received pulses via a resistor 519 into the emitter-base circuit of (2) a transistor 520 which amplifies the energy and feeds it via its collector to (3) a low pass filter comprising inductor 521 and capacitors 522 and 523, terminated at one end in a resistor 524 and at the other by the receive side of the hybrid transformer 53.

Power for the demodulator is supplied by a source of potential applied between a tap on the secondary of the transformer 517 and the side of the output load remote from the transistor 520.

The line equipment so far described with reference to FIGURE 5 provides bothway transmission between a 2-wire subscriber's line (51, 52) and 4-wire multiplex channels (514, 515) using a permanently allocated channel P$x$ in the multiplex, a number of such 2-wire lines equal to the number of channels in the multiplex and each using one channel in the multiplex being connected to one pair of 4-wire multiplex channels to form a multiplex group. In each direction there can be transmitted a D.C. signal independent of an audio signal (in the circuit of FIGURE 5 of the D.C. signal out of the demodulator is not used) and an audio frequency signal provided that there is a D.C. pedestal pulse which the A.C. can modulate. A line which is idle i.e. has no line current, produces zero amplitude pulses in channel 514 at its channel pulse time. When the line is looped the result- the line current produces constant amplitude pulses at the line's channel time and these are used as described later in this specification in the setting-up and control of calls to and from the line. To set up a call to a line which is being called similar pulses are required and are generated by apparatus shown in FIGURE 5 below the line equipment and operated by the apparatus within the chain dotted line on FIGURE 5 and commonly known as a marker. This apparatus, on being supplied with the directory number of a subscriber's line or group of P.B.X lines, produces a D.C. current in a single wire output, there being as many single wire outputs as directory numbers in the exchange. Apparatus performing this function is known in the art using for example relays. For the line shown in FIGURE 5 the single wire output has a high internal impedance and feeds current to a diode 525 to bias it to its low-resistance direction of conduction whereby it is rendered low resistance to currents of both polarities. The single wire output is terminated on a terminal $t_d$ of a set of terminals for all such single wire outputs. Another set of terminals provides one terminal $t_e$ for each line equipment in the exchange. From a terminal $t_e$ a lead is taken via a diode 526 to a lead 527 common to all the line equipments in a multiplex group. A lead from a terminal $t_e$ to its diode passes through a magnetic ring 528 pulsed by a current in a winding 529 to produce an E.M.F. in the lead tending to produce a current in the low resistance direction of the diode 526. A magnetic ring 528 is provided for each of the channels in the multiplex and each ring is pulsed for the duration of one of the multiplex channels. A lead from a terminal $t_e$ of a line equipment having channel pulse P$x$ allocated to it threads a ring 528 pulsed with the same channel pulse P$x$. Each line equipment has a directory number by which it is identified. The terminal $t_e$ of each line equipment is jumpered to its directory number $t_d$. A number of line equipments all having the same directory number e.g. P.B.X lines, have their $t_e$ terminals all jumpered to the same $t_d$ terminal. A terminal equipment identified by two directory numbers e.g. for day and night service, has its $t_e$ terminal jumpered to the two directory number terminals $t_d$ with additional decoupling, e.g. diodes, in the jumper if either of the $t_d$ terminals is also jumpered to the $t_e$ terminal of another line equipment. Normally, i.e. with no $t_d$ terminal marked, E.M.F.'s are induced into the leads threading the magnetic rings 528 but no currents flow because although the direction of the E.M.F.'s is that of the high conduction of the diodes 526 it is in the low conduction direction of the diodes 525 in series with them. When the marker is operated to mark a terminal $t_d$ by passing current through its diode 525 thereby biasing it to its high conduction direction, current can pass to the lead 527 of any terminal $t_e$ jumpered to the marked terminal $t_d$. Hence there is produced in a lead 527 a current at the channel pulse time of a line equipment having the directory number marked by the marker, the current being coincident in time and arranged to be substantially the same in value as the current in lead 514 produced by looping the line conductors 51, 52 of the line equipment.

Figure 2:
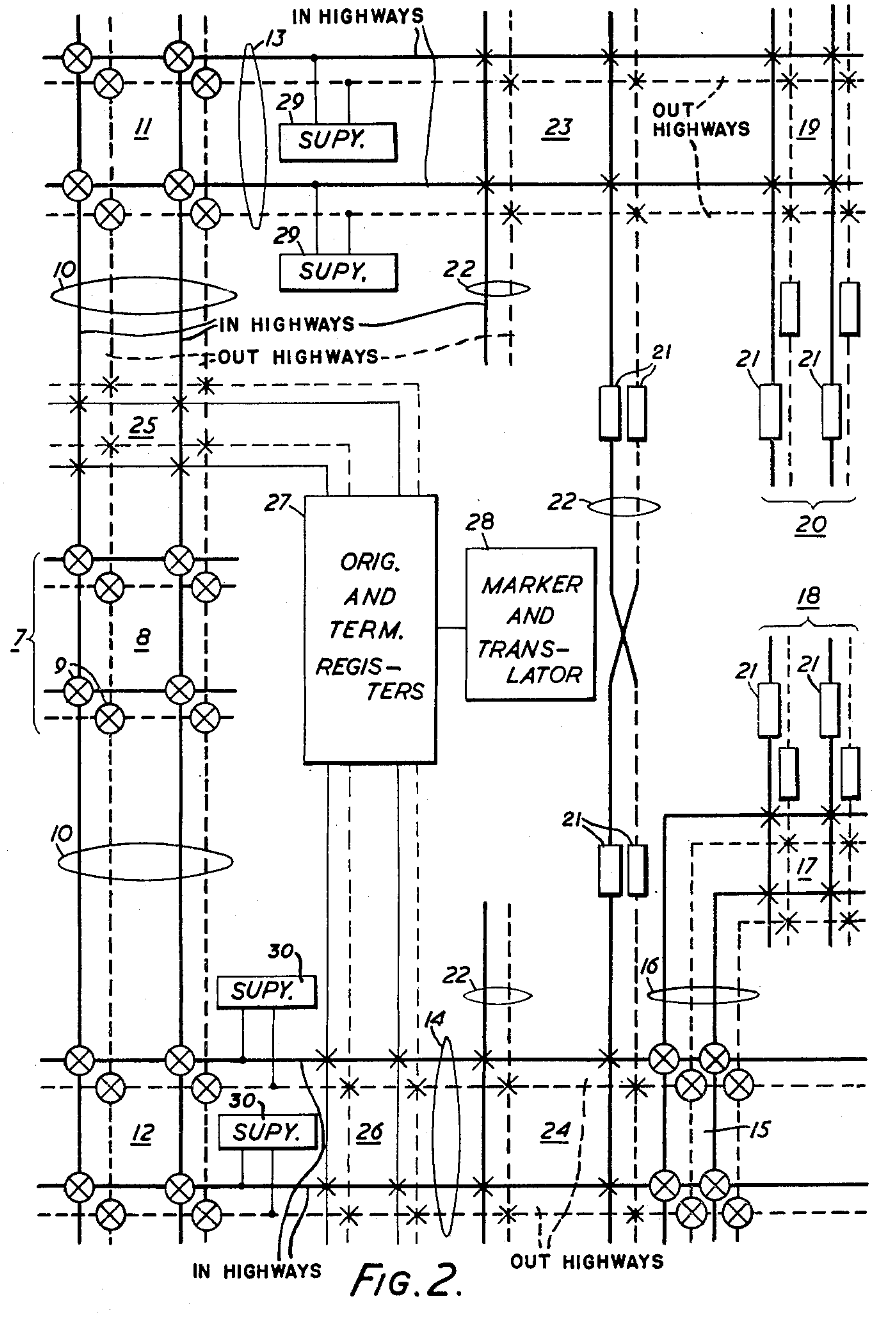

The leads 515, 514 and 527 are common to the line equipments of a multiplex group and have gated connections with leads 531, 532, 535 and 536, the leads 530 to 536 comprising a trunk 7 of FIGURE 2. Pulse amplitude-modulated current pulses received over lead 514 flow into a resistor 560 to produce voltage pulses on the bases of two transistors 538 and 539 which, with resistors 540 and 541 in their respective emitter circuits, produce current pulses in their collector circuits proportional to the pulses on lead 514, the current pulses from transistor 539 flowing to lead 532. Amplitude-modulated current pulses received over lead 531 flow into resistor 542 to produce voltage pulses which are applied to the bases of transistors 543 and 544 which, with resistors 545 and 546 in their respective emitter circuits, produce current pulses in their collector circuits proportional to the pulses in lead 531, that from transistor 543 flowing to lead 515. However, it is not desirable that the whole of a current pulse received over lead 531 should flow to lead 515 since it includes at the beginning and end of the pulse, transients picked up from other circuits and liable to produce cross-talk. The pulse is therefore strobed by the BP4′ pulse to admit only the steady central portion to the lead 515, the strobe comprising a transistor 547 with its emitter-collector circuit in series with resistor 545 and normally high-resistance which is converted to low resistance by the BP4′ pulse applied on the base of the transistor. The transistor 544 is similarly strobed by the pulse BP3′ using transistor 548. As disclosed in the specification of patent application No. 1,611,/62 each multiplex channel can carry a signal pulse during one portion of the channel time and a speech pulsed during another portion of the channel time, without mutual interference. It is assumed for this example that the lead 531 receives during each active channel pulse time a signal pulse in the early part of the time, this being gated into the collector circuit 549 of the transistor 544 by the circuit including that transistor and transistor 548, and a speech pulse in the late part of the time, this being gated to lead 515 by the circuit which includes transistors 543 and 547. The signal path into the lead 549 may be used for any convenient purpose; in this example it will be assumed to be used for metering. The lead 530 is a transmission channel in parallel with and similar to that of 531, and can also be used for any convenient purpose, for example, to operate relays to ring lines equipped with bells requiring high-power low-frequency ringing. Lead 533 is a transmission path in parallel with and similar to lead 532 and which can be used for any convenient purpose, for example, signalling the coins inserted into coin boxes.

Every cross-point connected to the leads 530 to 533 of a multiplex group has a connection to lead 537 over which it provides a current pulse when it operates to close the cross-point. Hence, over lead 537 appear current pulses coincident in time with the channel pulses of all the line equipments which are connected via the co-ordinate switch 8 to trunks 10 of FIGURE 2. These current pulses are applied to the base of a transistor 550 to produce in its collector circuit amplified versions of the current pulses.

Returning now to the current pulses in the collector circuit of transistor 538, these normally are clamped by diode 551 but during a block pulse B*px'* transistor 552 transmits them to a winding of a transformer 553. With the polarities shown the base potential of the transistor 552 is normally above the clamp potential of the diode 551 and therefore the transistor is non-conducting but is brought below the clamp potential by the block pulse B*px'*. Thus, for the period of tht block pulse the channel pulse of any line 51, 52 which is looped will appear in the transformer 553 of its multiplex group. The secondary winding circuit of that transformer includes a diode 554 through which the pulses normally pass and a transistor 555 through which the pulses pass for the period of a multiplex group pulse *m*G*py'* to a transformer 556. A different multiplex group pulse *m*G*p* is allotted to each multiplex group in the exchange. With the polarities shown, the base potential of the pnp transistor 555 is normally above the clamp potential of the diode 554 and therefore the transistor is non-conducting but is brought below the clamp potential by the multiplex group pulse *m*G*py'*. Thus, the channel pulse of any line 51, 52 which is looped will appear in the transformer 556 of its multiplex group pulse *m*G*py* allocated to its multiplex group and coincident with a block pulse B*px'*, and no two transformers 556 can be pulsed at the same time. Pulses from the transformer 556 are fed via a resistor 557 to the base circuit of a transistor 558 having a transformer 559 in its collector circuit and in which the channel pulses appear except for those channels which are already connected by a cross-point into the exchange. As already described, channels so connected cause transistor 550 to conduct and thereby shunt the current from the transformer 556 from the base circuit of transistor 558 to the collector circuit of transistor 550.

A block phase B*p* having a duration of one cycle of multiplex group pulses and each multiplex group pulse having a duration of one multiplex cycle, it will be appreciated from the foregoing description that the lines in the exchange are scanned in serial order during one block pulse, and every line which is looped but not connected through the exchange produces one pulse in the transformer 559 of its multiplex group. This one pulse is used for initiating an originating call through the exchange as will be described later in this specification.

For reasons which will appear later and particularly in large exchanges it may be undesirable to scan all the lines in an exchange in one operation. The lines may be divided into blocks, each allocated a different block pulse but using the same series of multiplex group pulses.

Terminating calls are initiated during block pulses other than those used for originating calls as just described. A terminating call is described by a directory number which is communicated to the marker which marks one terminated $t_d$ as previously described. It is arranged that the terminal is marked at the beginning of a block pulse and for the duration of the pulse the channel pulses of all line equipments having that directory number appear in the transformers 553 of their multiplex group and these are gated in multiplex group order to their transformers 559 by the transistor 555 circuit as described for originating calls. Hence, the lines in a block are scanned in serial order during the block pulse and every line which has the directory number set up in the marker produces one pulse in the transformer 559 of its multiplex group. This one pulse may be used for initiating a terminating call through the exchange. If there is only one line with the specified directory number and it is free and has a free path to the calling line its one scanning pulse will initiate a terminating call. If there is more than one line with the specified directory number each in turn will have the opportunity to terminate a call and the first which is free and has a free path to the calling line will produce a pulse in its transformer 559 to initiate a terminating call. It is a feature of the invention that the chain of operations which is necessary to the making of a connection through the exchange cannot be started unless a free path exists for the connection to be completed i.e. blocking through the switches prevents connections being started, and it is a further feature that the free or engaged state of a line and the availability of a path through the switches to a line or trunk to which it is to be connected are tested during the early part of the scanning channel pulse of the line so that a connection is initiated or refused during that pulse. Hence, if more than one line has the same directory number the lines will be scanned in order and the first to be free and have a free path to the calling trunk is ultimately connected. The total number of lines in a block may be, for example, 1500 and it is desirable that all the lines of a P.B.X group should be contained within one block. It is a common requirement that P.B.X lines in a group should be tested in a preferred order. This is very simply achieved in the system being described by arranging them within one block in the order in which they are required to be tested. Except for this limitation the lines may be located anywhere within the block which is operationally and economically advantageous. If no group of P.B.X lines is spread over more than one block of lines, all blocks may be scanned simultaneously for terminating calls. If a group, because it is so large or for other reason, is spread over more than one block, the blocks must be scanned separately and the lines arranged in blocks in the order in which they are to be tested.

*Detailed description—Coordinate switch layout*

Figure 3:
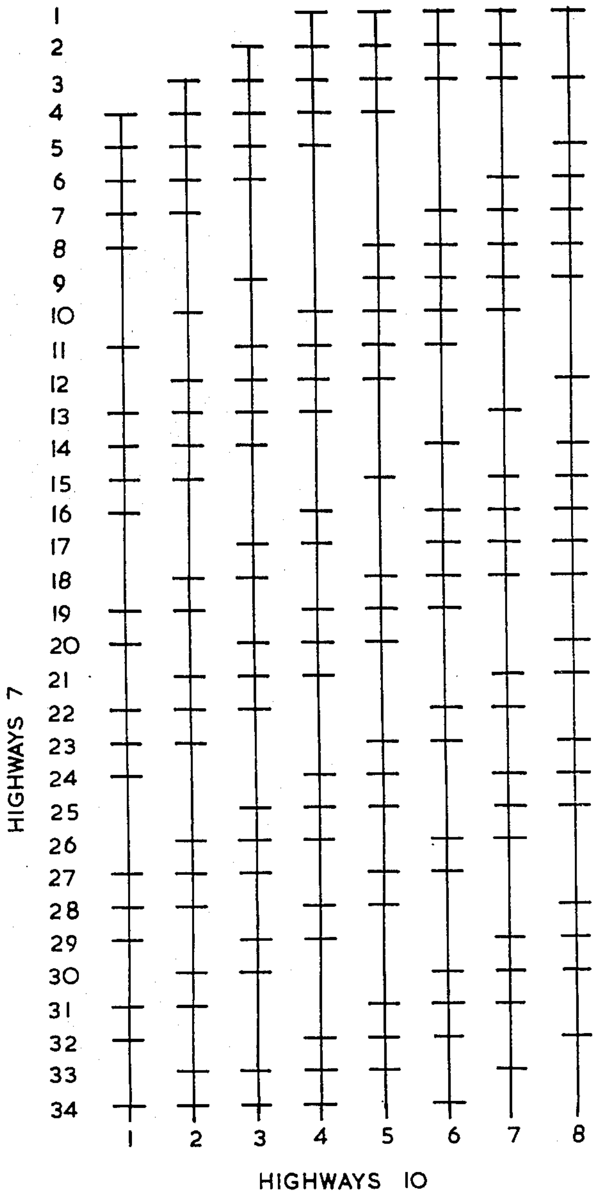
Figure 6:
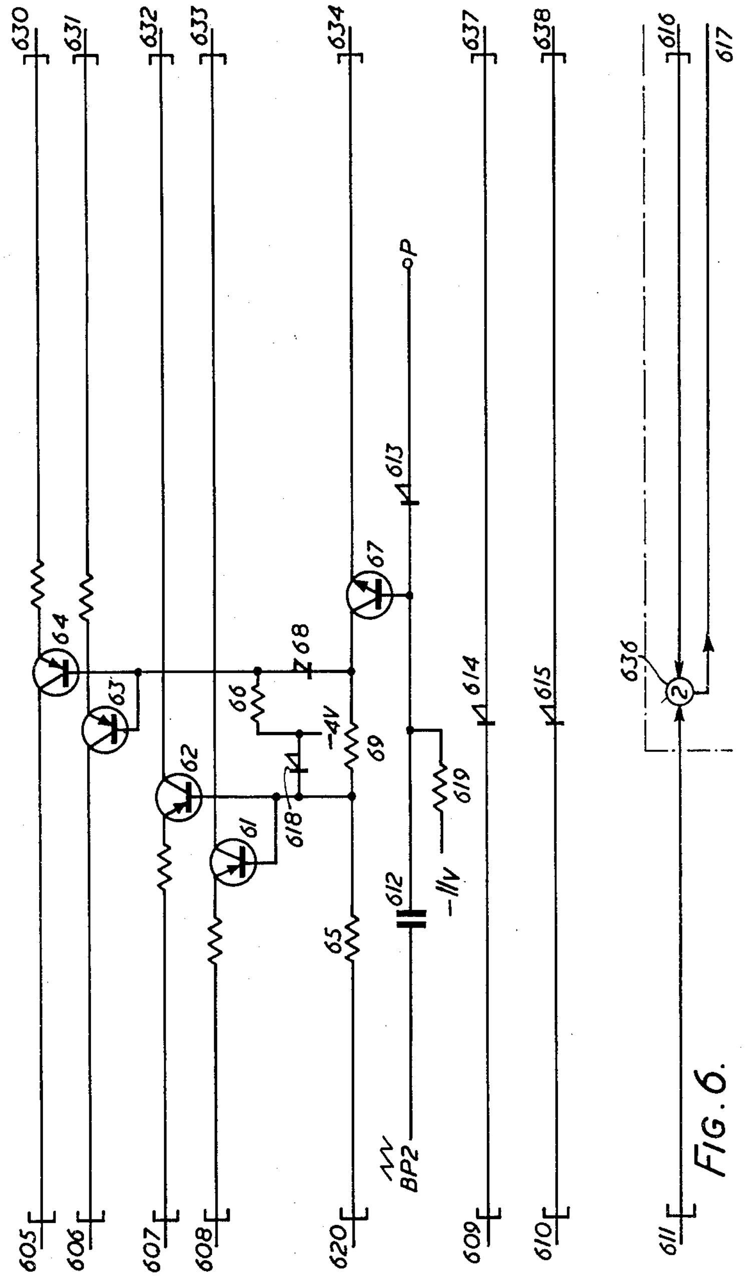

All cross points in the exchange have the same basic circuit shown in FIGURE 6. Four transistors are connected at their bases in two pairs, 61, 62 and 63, 64 and provide switching between two trunks in a co-ordinate array of crosspoints e.g. as described with reference to FIGURE 3, each trunk having two transmission paths in each direction of transmission. In series with each emitter is a resistor which, together with the emitter impedance when the transistor, is switched on (i.e. conducting) provides a suitable terminating impedance for a cable terminating at the cross-point. The bases of the transistors 61, 62 are normally at earth potential derived via a resistor 65, the bases of transistors 63, 64 being at a different potential, negative with respect to earth for the polarities assumed in this example, and derived via a resistor 66. In the normal condition none of the transistors 61 to 64 is conducting. They are all made conducting by current through a transistor 67 the collector of which is connected to the bases of transistors 61, 62 via a resistor 69 and to the bases of transistors 63, 64 via a diode 68 which prevents current flow from the bias voltage connected to resistor 66 to the earth on resistor 65. Transistor 67 when conducting bottoms and thus brings the potential of the bases of the transistors 63, 64 near to that of its emitter, and causes the bases of the transistors 61, 62 to be clamped by diode 618 to the potential of the bases of transistors 63, 64 when unoperated. Assuming the trunks to the left of the cross-point to be the rows and those to the right to be the columns of a co-ordinate switch, all the cross-points of a row have their resistors 65 commoned and current through the common (as to the base of transistor 550 FIGURE 5) indicates a cross-point operated in that row; and all the cross-points of a column have the emitters of their transistors 67 commoned and current through the common (to the base of a transistor 71 in FIGURE 7) indicates a cross-point operated in that column. The normal potential of the emitter of transistor 67 is that of the emitter of the transistor to the base of which it is connected. Its normal average base potential is derived via resistor 619, the actual potential following the saw-tooth wave BP2 of FIGURE 4(*a*) connected via a capacitor 612 to the base of the transistor. The cross-point is switched on for one channel pulse by a current pulse via terminal P and diode 613 at the beginning of the channel pulse i.e. when the wave-form BP2 is at its minimum. The current pulse is a short one which charges up the capacitor 612 until the transistor 67 bottoms and its base current absorbs most of the incoming pulse current. Thereafter the capacitor 612 is discharged into the base circuit of the transistor 67 maintaining it in the bottomed condition until the saw-tooth wave-form suddenly switches the transistor off. The cross-point does not switch on again at the next peak of the saw-tooth waveform because of leakage via resistor 619. The diode 613 prevents the capacitor 612 from discharging via the pulse source P.

The cross-point has two additional paths which for one direction of current defined by diodes 614 and 615 connect the corresponding paths of the row and column trunks intersecting at the cross-point. These are concerned in the marking of free paths as will be described in due course. Yet another path through the cross-point includes an AND-gate 636 with two inputs one from the row trunk and one from the column trunk. The gate 636 is shown symbolically and may take a known form such that when currents are applied separately to the two inputs there is no output but when supplied on both inputs simultaneously there is an output via the lead 617. The AND gate 636 and an associated part of FIGURE 7 are shown enclosed in a chain-dotted line to separate the symbolic and circuit schematic representation of the system under description.

*Detailed description—Calls*

Figure 7:
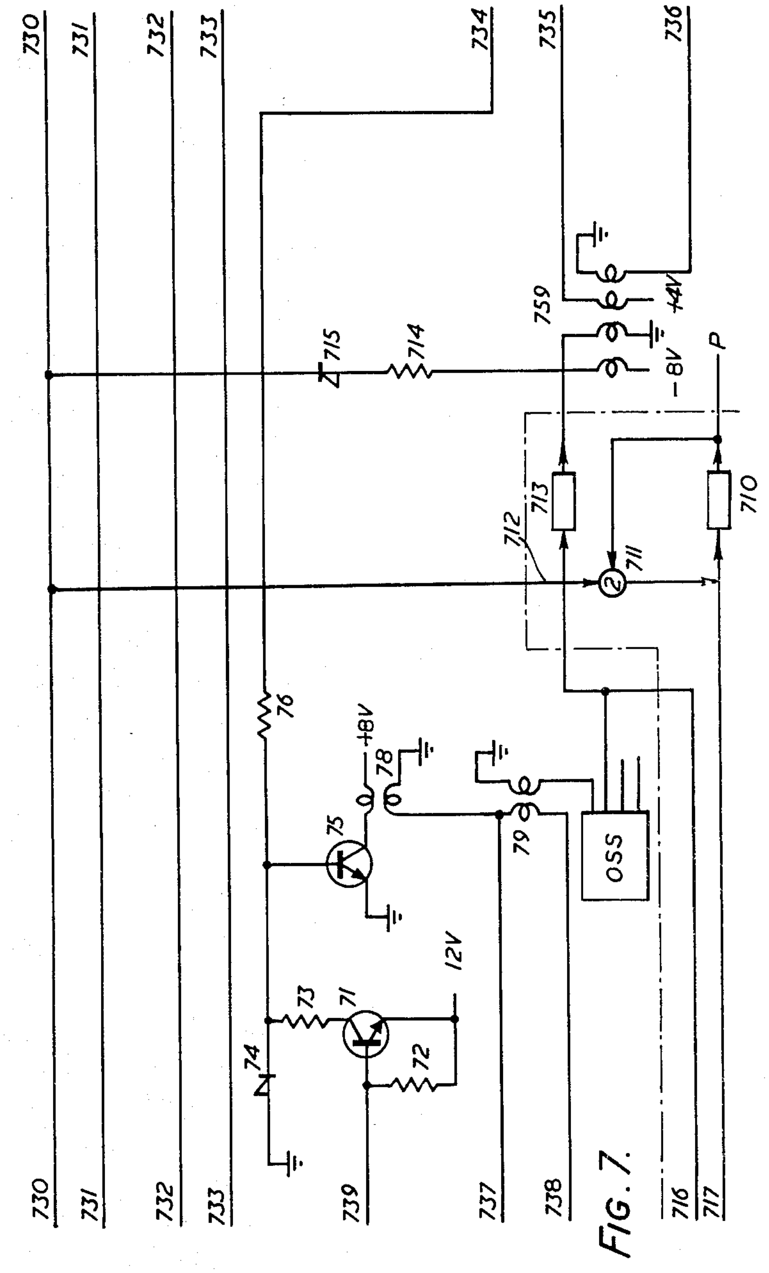

Referring now to FIGURE 7 this shows the equipment at one of the terminal ends of a multiplex trunk, this equipment being concerned with the marking, setting up and holding of calls. The transistor 71 has already been mentioned as being rendered conducting by current from an operated cross-point connected to the multiplex trunk. Its emitter is connected to a suitable bias potential to which its base is connected via a leak resistor 72. Current from a cross-point causes the transistor 71 to bottom with current via a resistor 73 and diode 74 in its collector circuit. The junction of the resistor and diode is connected to the base of a transistor 75 which forms a gate circuit which passes to its collector circuit in amplified form, current received via resistor 76 unless inhibited by current via resistor 73 which if it flows always exceeds the current via resistor 76. In the system according to the invention there is a stage by stage operation of cross-points to make a connection between a single marked originating trunk or line and one of one or more destination trunks or lines. A trunk which has a free multiplex channel path to a destination trunk or line has in its marking lead 734 in FIGURE 7, current during the channel pulse time, which current flows into the base of transistor 75 unless there is an operated cross-point connected to that trunk toward the originating trunk or line at that channel time, in which case the current over the marking lead 734 flows mostly into diode 74. Current into the base of transistor 75 causes the collector to bottom and apply via transformer 78 a voltage pulse on lead 737 to lead 637 (FIGURE 6) to diodes 614 (FIGURE 6) of all the cross-points connected to that trunk and via transformer 79 and lead 738 and lead 638 to the corresponding diodes 615 (FIGURE 6). The currents through diodes 614 become the currents in marking leads 534 of the trunks toward the originating trunk or line and having cross-point connections to that trunk in question. Current flows in diodes 615 (FIGURE 6) only when a cross-point is to be selected at a particular co-ordinate switch and then only in the diodes of the cross-point of that switch. It will be seen that the diodes 615 are normally biased into the low conducting condition by a bias voltage at the winding of transformer 559 over leads 535 and 610. The bias is overcome by an originating marking pulse in the transformer produced as described in conjunction with FIGURE 5. An originating marking pulse over a lead 535 of a row trunk having cross-point connection to a column trunk having a coincident free destination marking pulse in its transformer 78 causes current to flow in the diode 615 of the cross-point connecting the row and column trunks, to signal that this cross-point may be selected for operation at the channel pulse concerned. The coincidence is detected by current flow in the primary of transformer 79, causing current in the secondary which via OOS applied to the AND-gate 636 along with current from the other input 611 produces a pulse output over leads 617 and 717 which is applied to an iterative pulse store 710 for example a magneto-striction delay line circulating store as known in the art or an equivalent ferrite core store driven by channel pulses. A channel pulse applied to the input appears continuously at the output P so long as the circulating path is unbroken. The circulating path is shown as including an AND gate 711 which breaks the path when no input appears over lead 712. A connection once established via a cross-point using pulse channel P*x* is held by a controlling unit for as long as required by a hold pulse on pulse channel P*x* over transmission channel 730.

The output P from the store 710 (FIGURE 7) is applied to the cross-point at point P (FIGURE 6). Iterative stores to operate cross-points are known in the art and are therefore shown symbolically and not in detail.

Figure 32:
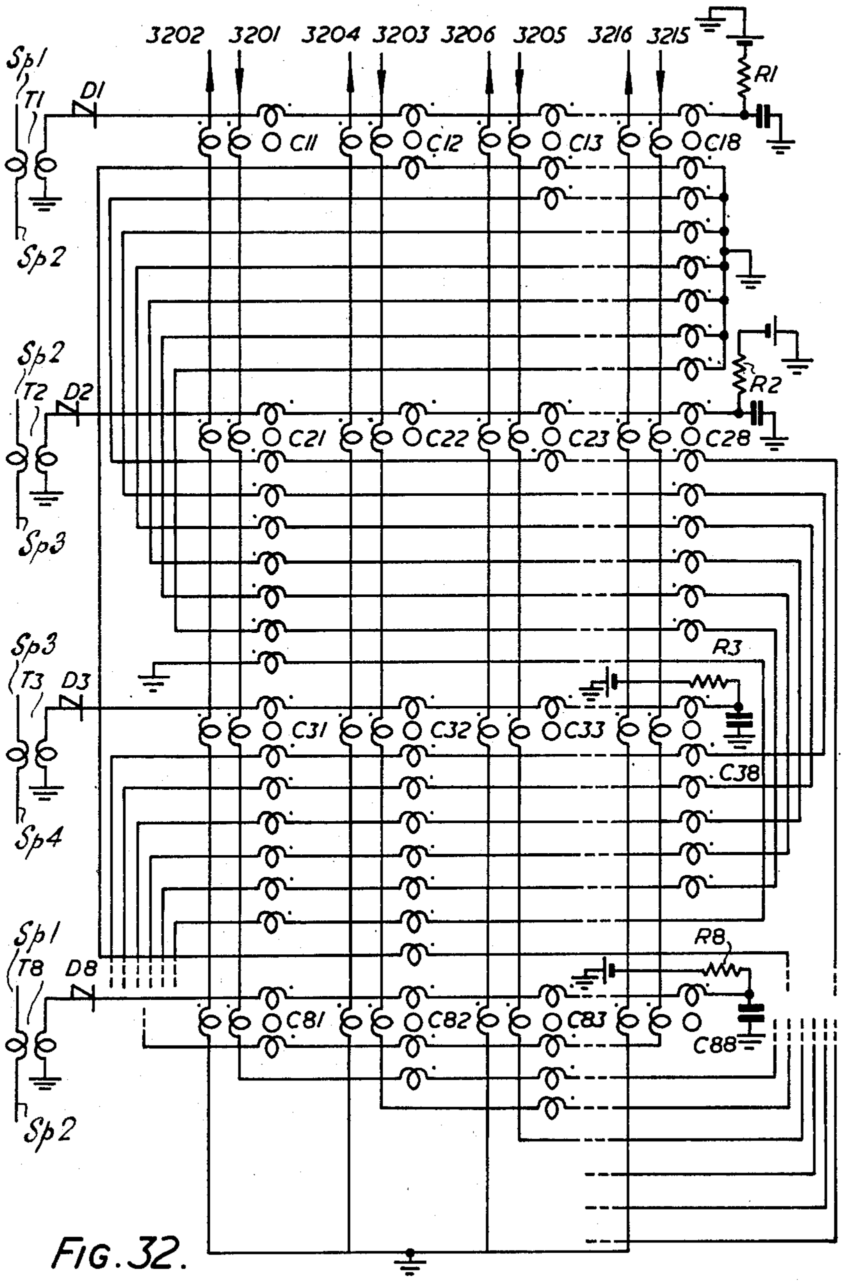

When a connection is to be made at a co-ordinate switch there is one (row) trunk marked and more than one (column) trunk free and having a free path to a destination trunk or line. The previous description of the selection and operation of a cross-point stated that current out of the transformer 79 (FIGURE 7) was applied to the AND-gate 636. In general, more than one of the (column) trunks will be free and useable and will provide a pulse via its transformer 79 and a selection of one of these has to be made. This is accomplished by one-only selector OOS in FIGURE 7 which has an input from the transformers 79 of all the (column) trunks to the co-ordinate switch, and an output corresponding to each input. Pulses on one or more of the inputs produce a pulse on one of the corresponding outputs, thus selecting only one (column) trunk for connection to a marked (row) trunk. It is desirable that the selection of the one (column) trunk should have a random element in it. A suitable one-only selector OOS is illustrated in FIGURE 32 and described later in this specification.

The output from the one-only selector, in addition to being applied on leads 716 to the AND-gates 636 of the trunk which it selects, writes a channel pulse into a store 713 similar to 710 but without the circulating feature. One multiplex cycle later the channel pulse is emitted from the store 713 to a transformer 759 to initiate the selection and operation of a cross-point at the next switching stage in the same way that the originating marking pulse over transformer 559 (FIGURE 5) initiated the selection and operation of the cross-point just described. No connection has yet been made however over which a holding pulse over lead 730 can hold the connection already made. The output from the store 713 is for this reason applied via a winding of transformer 759 resistor 714 and diode 715 to lead 730 to maintain via lead 712 the circulating path of the store 710, the bias voltage at the winding of the transformer in conjunction with the diode 715 ensuring that no permanent shunt is applied to lead 730.

Description has so far been given of the action of a single marking pulse from a transformer 559 FIGURE 5 in conjunction with free marking pulses over leads 734 (FIGURE 7) of multiplex trunks and a one-only selector OOS in producing a channel pulse which is written into a store 710 there to circulate so long as it is held in circulation by coincident channel pulses over lead 712, the store output P operating the selected cross-point and the store 713 emitting a single channel pulse to continue the selection.

Figure 8:
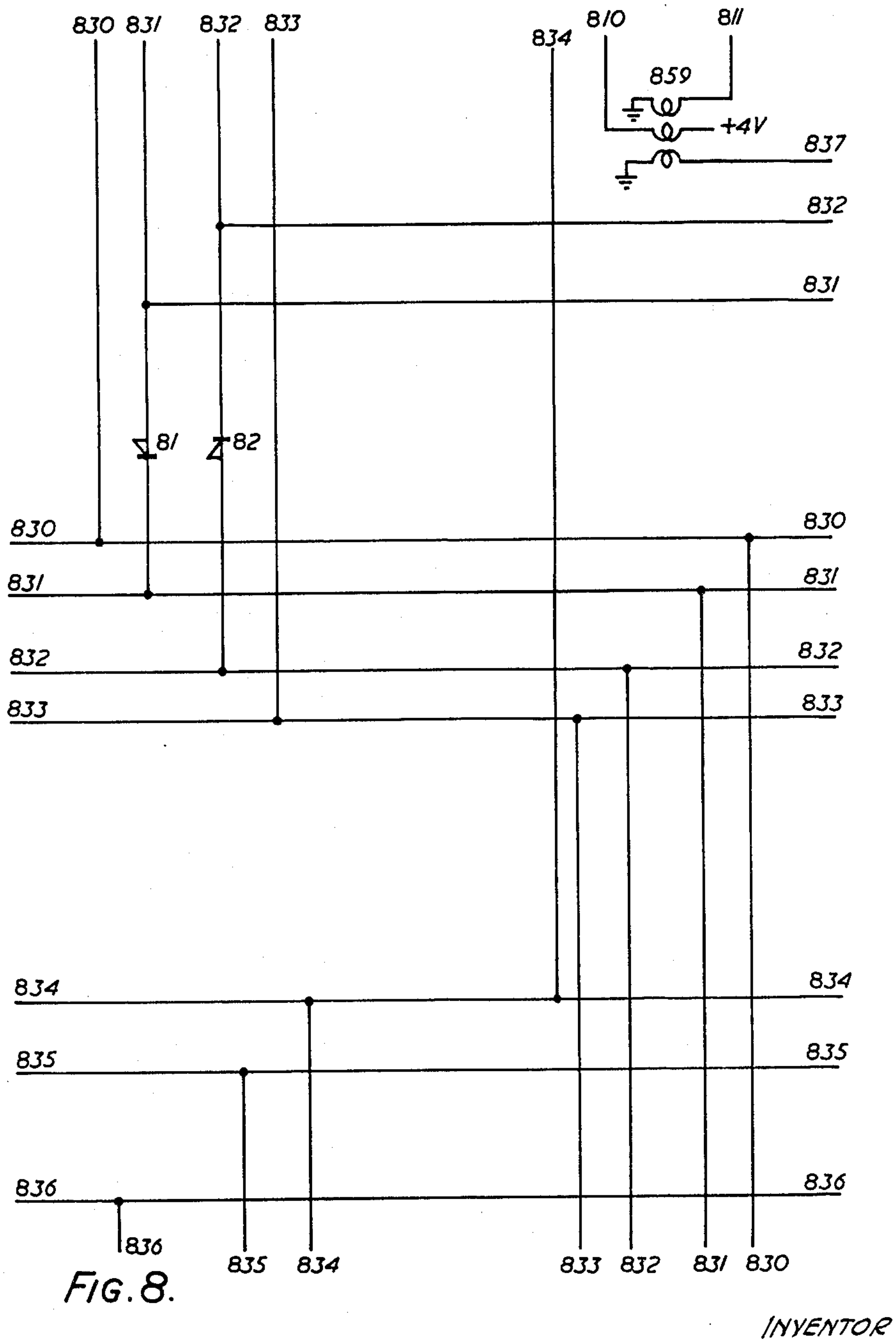
Figure 10:
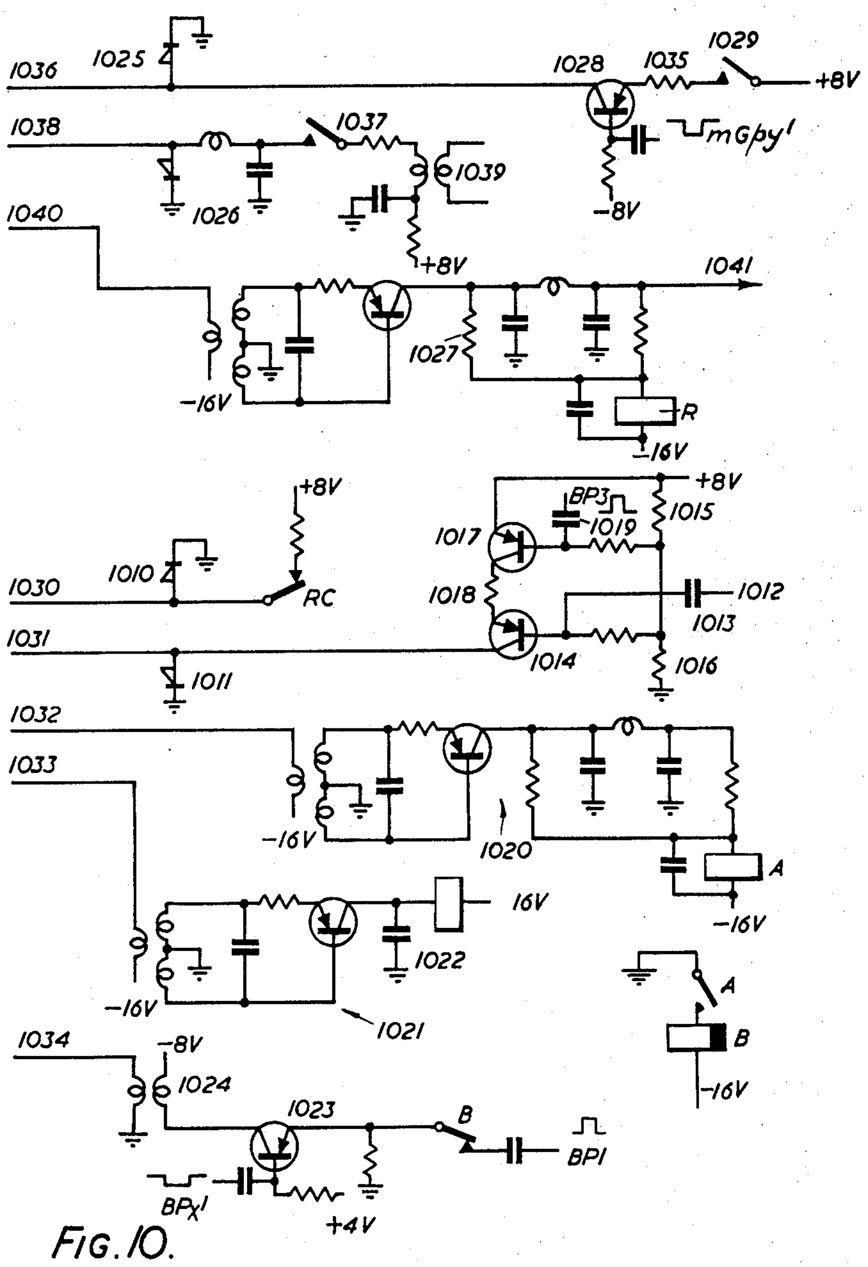
Figure 16:
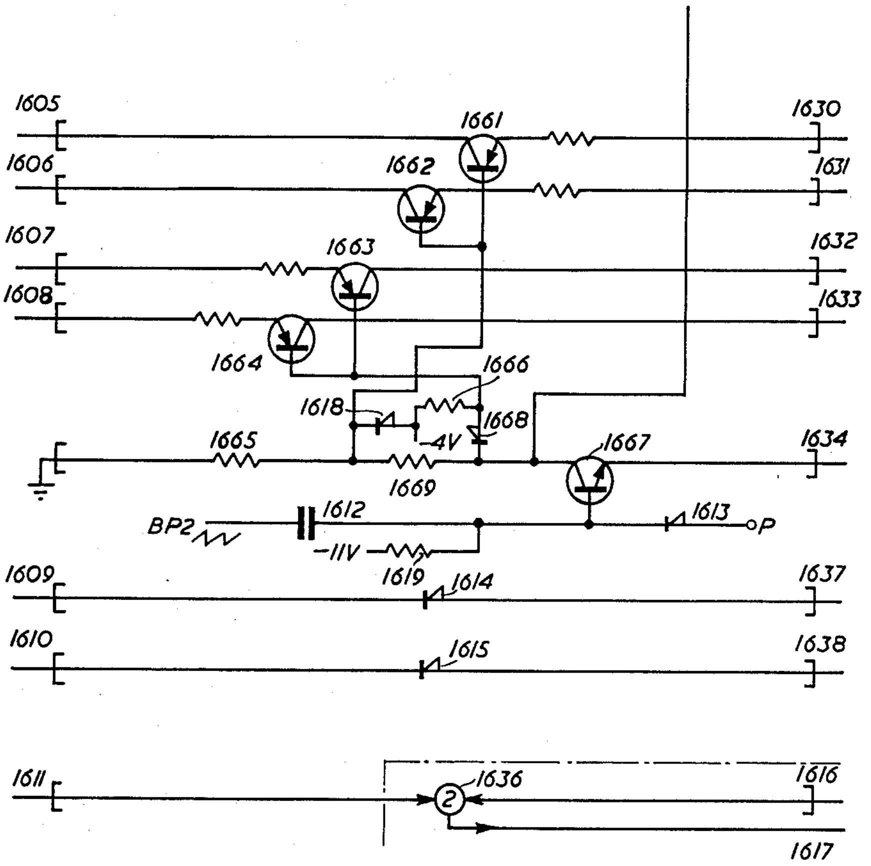
Figure 17:
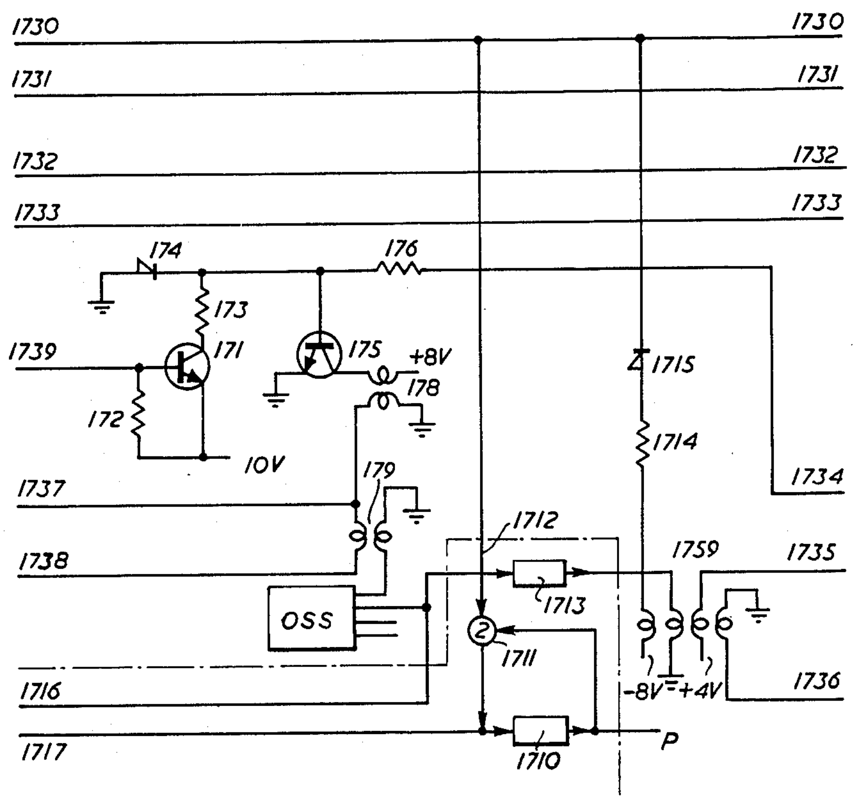
Figure 31:
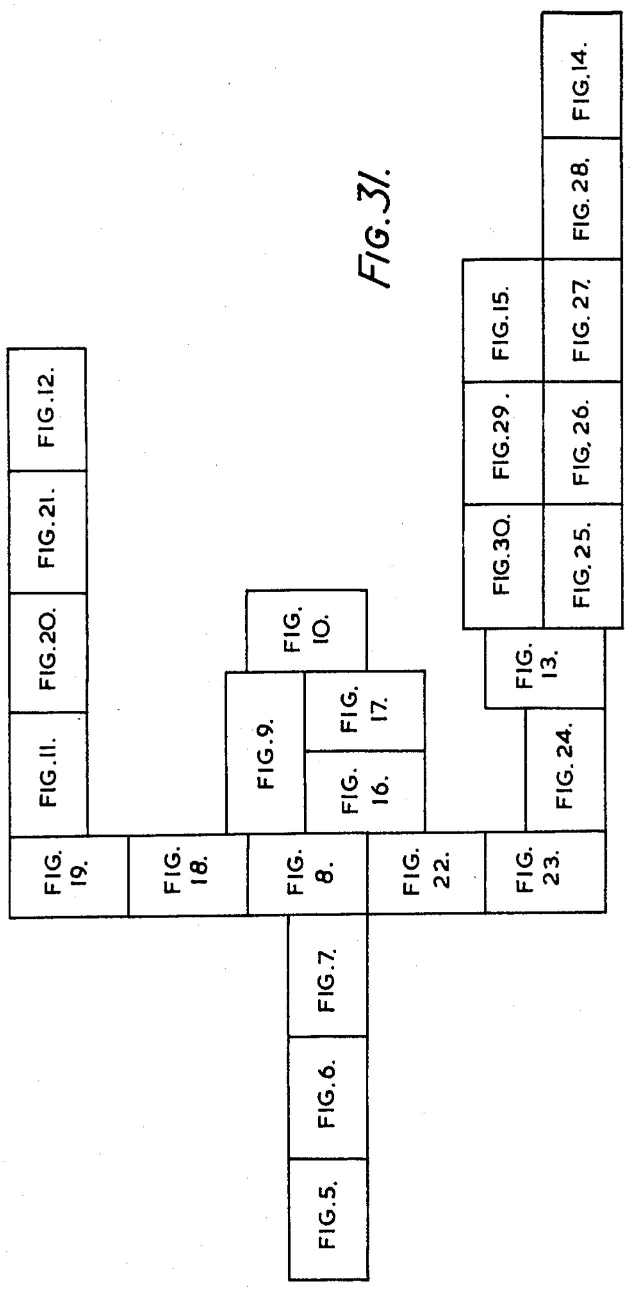

Proceeding from FIGURE 7 across FIGURE 8 in the manner indicated in FIGURE 31, FIGURES 16 and 17 represent cross-points giving access to originating registers represented in FIGURE 10. These cross-points form the switch 25 in FIGURE 2. One is selected and operated in the manner previously described for these figures, it being further noted that the holding pulse emitted from the transformer 1759 FIGURE 7 to lead 1730 not only hold the new cross-point but also passes through that cross-point to hold the previously connected cross-point.

*Detailed description—Registers*

Figure 9:
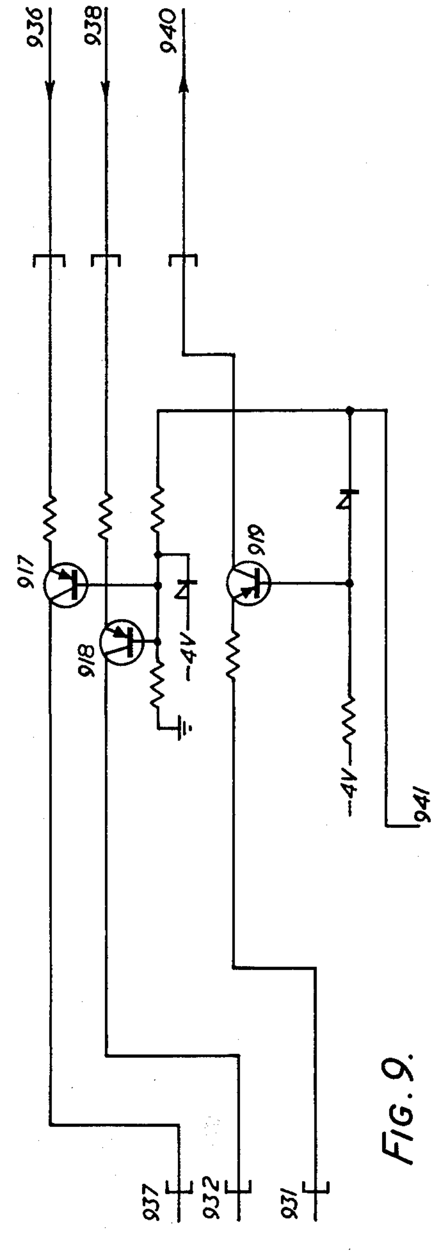
Figure 11:
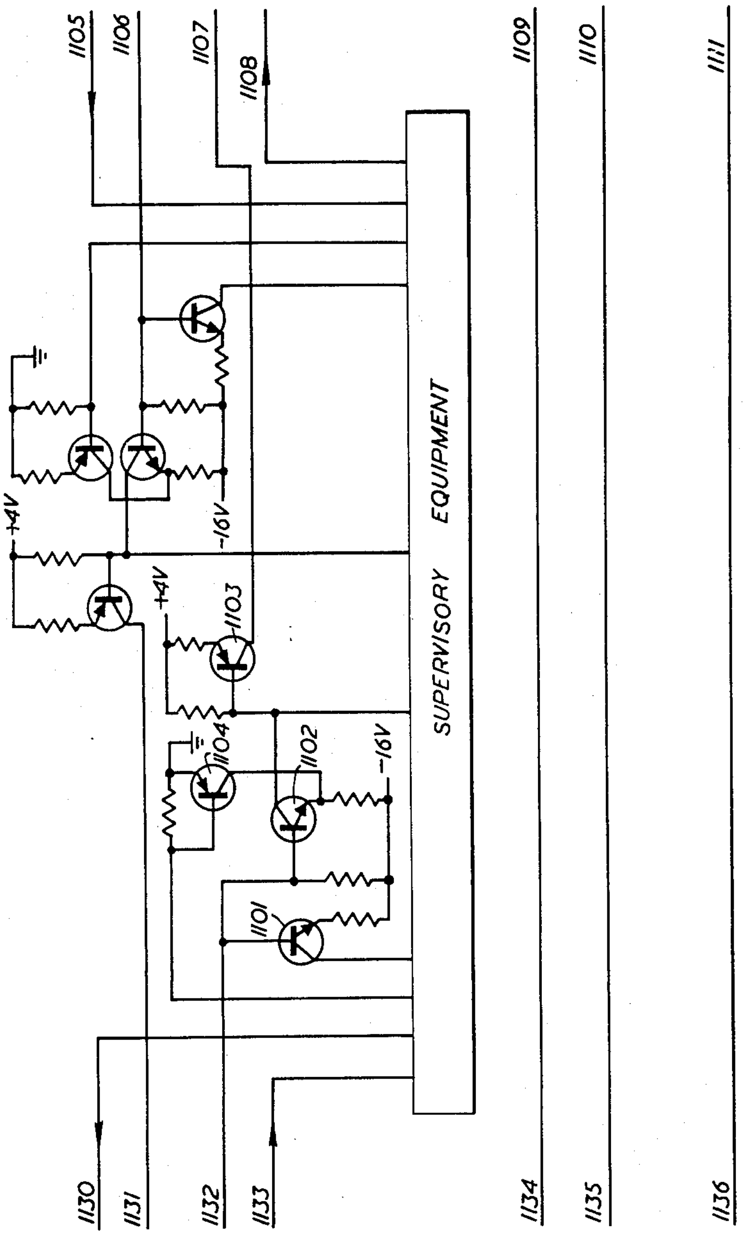
Figure 12:
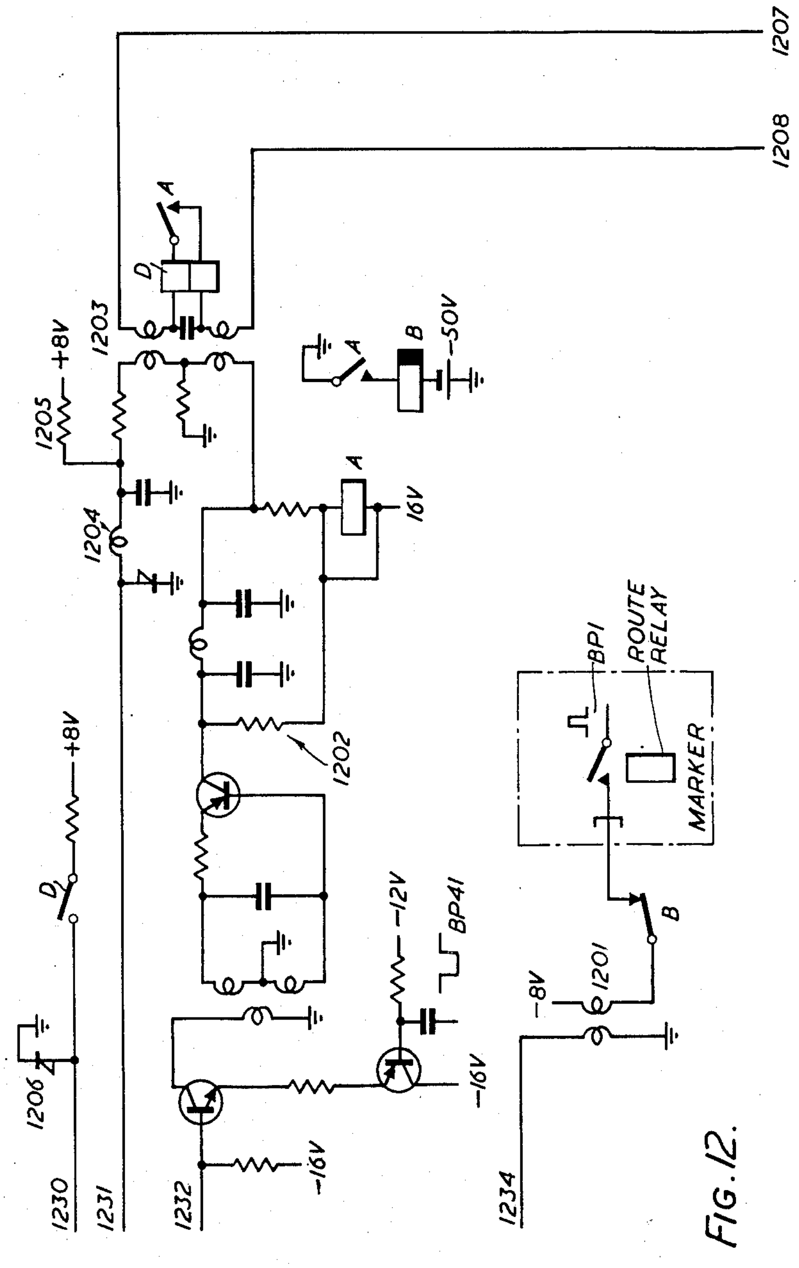
Figure 13:
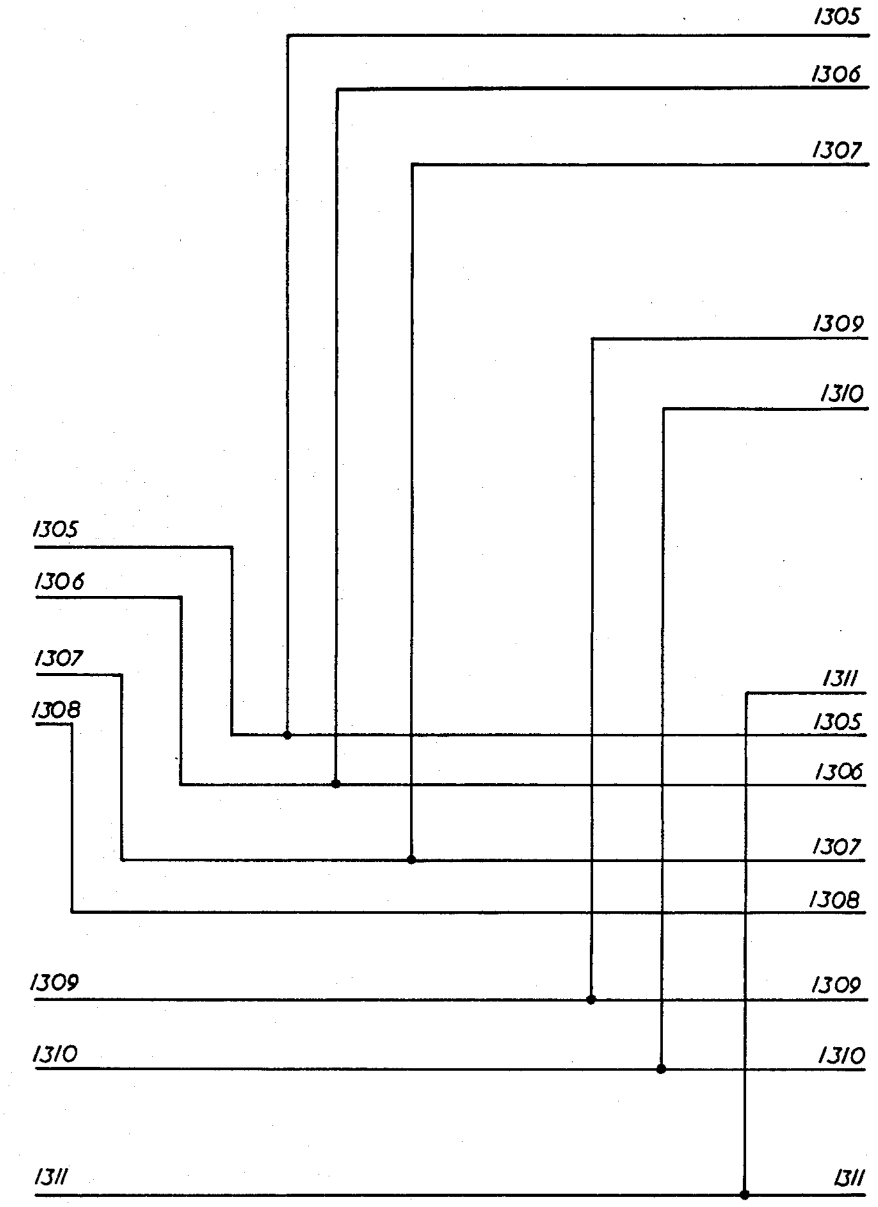
Figure 18:
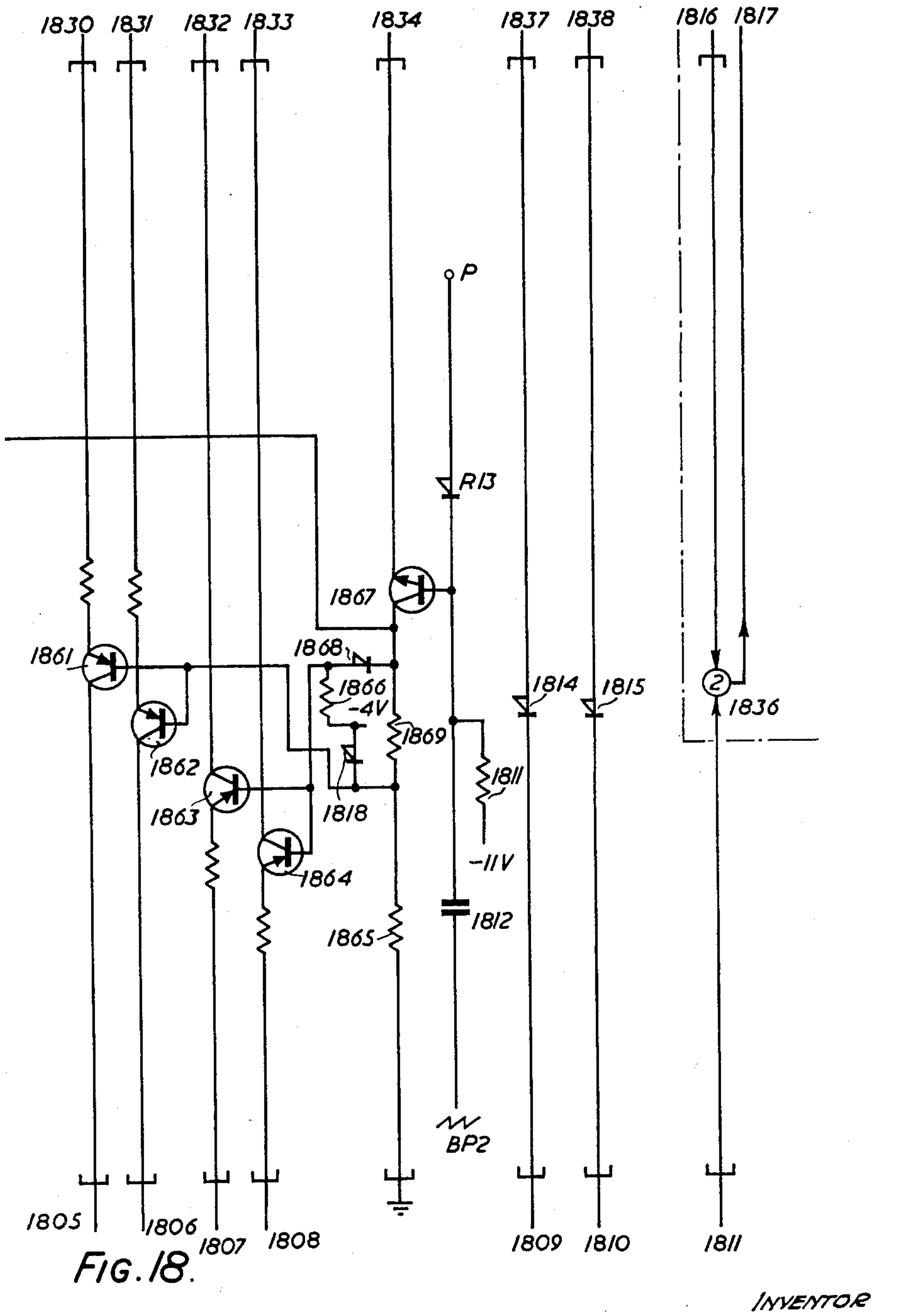
Figure 19:
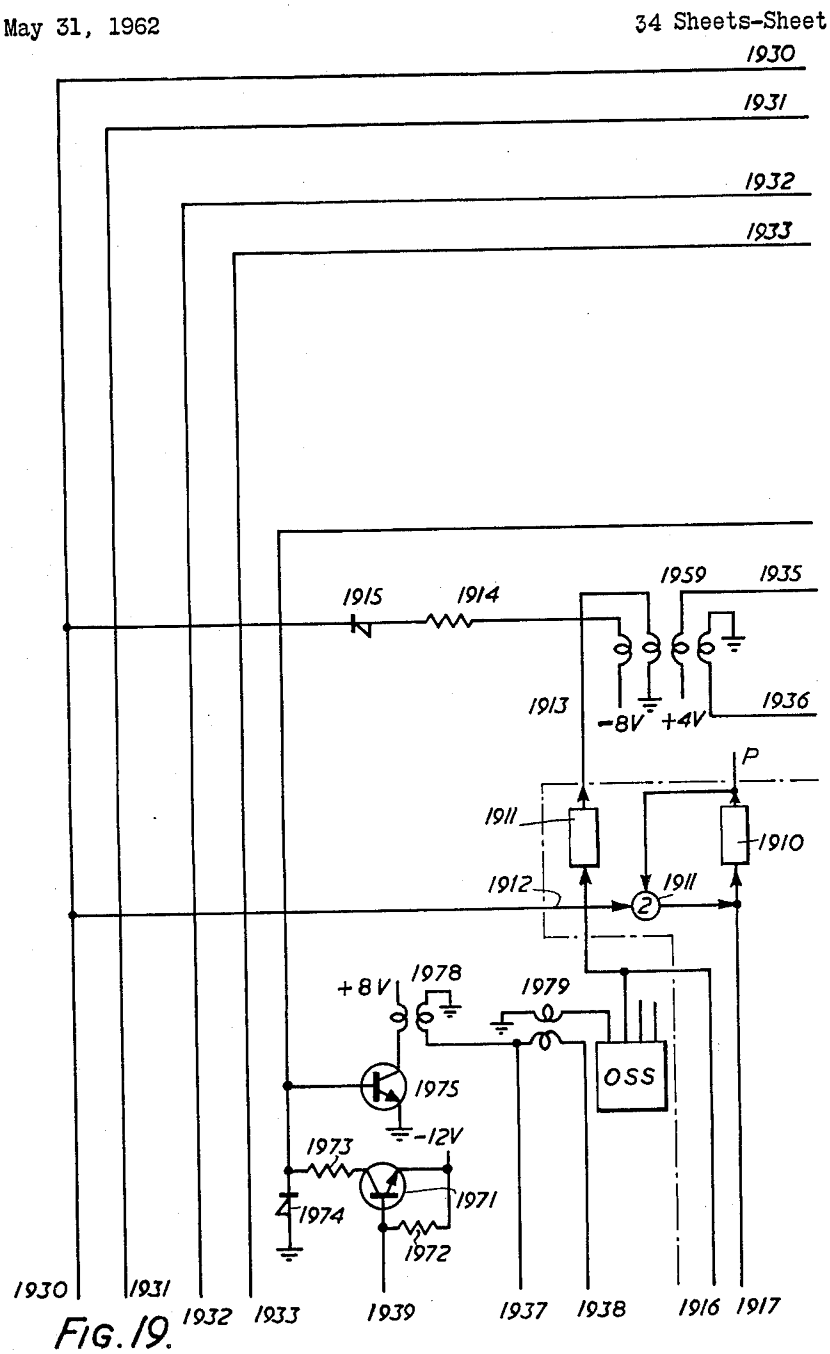
Figure 20:
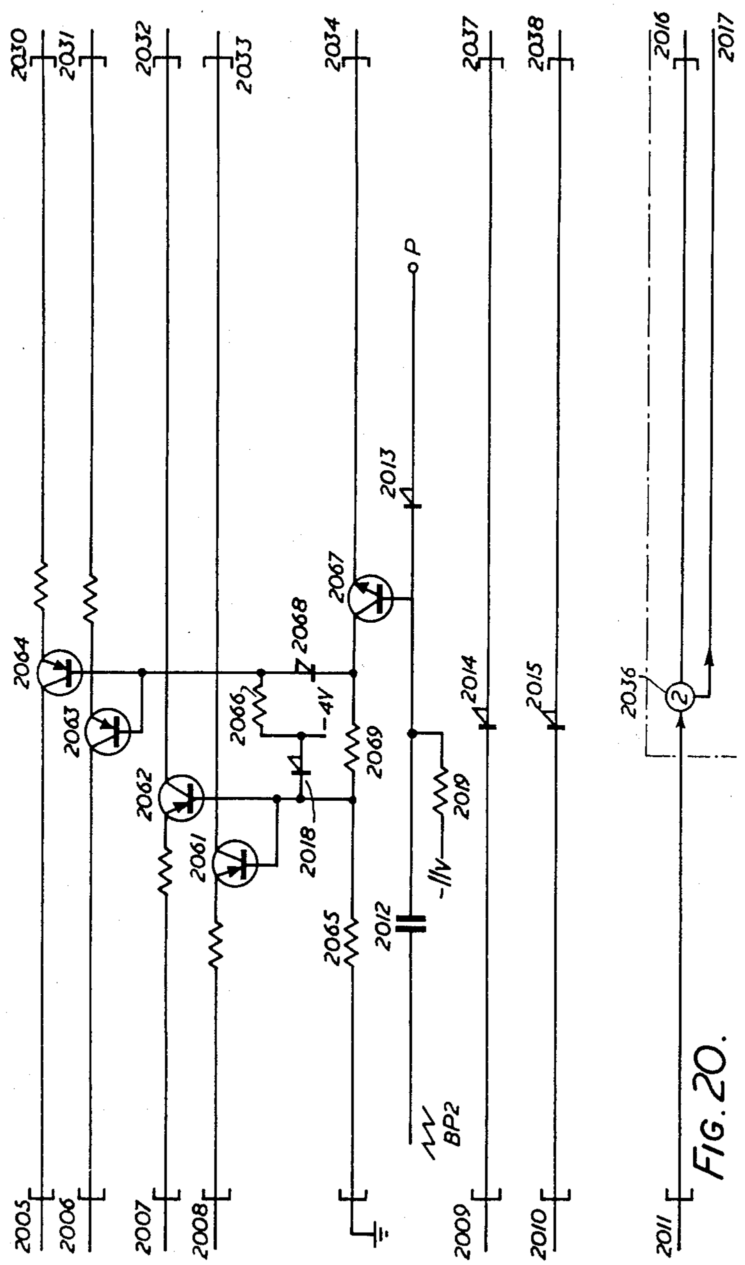
Figure 21:
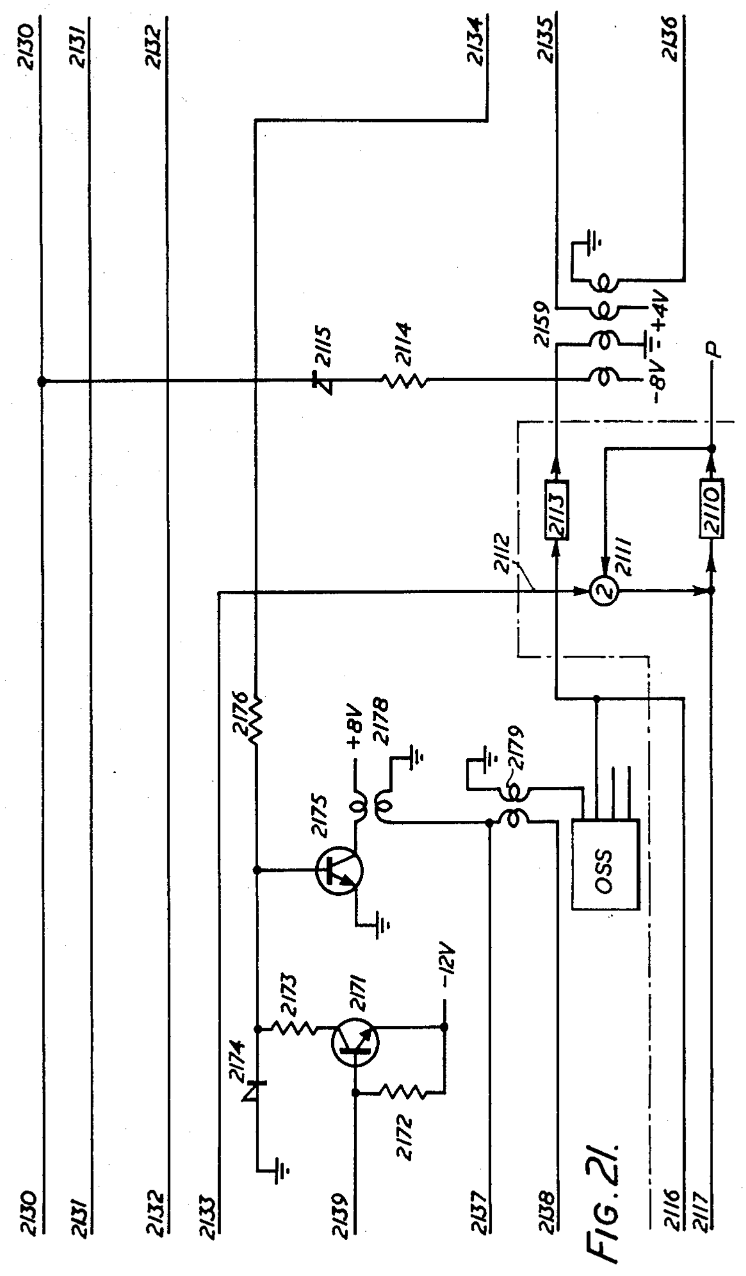
Figure 22:
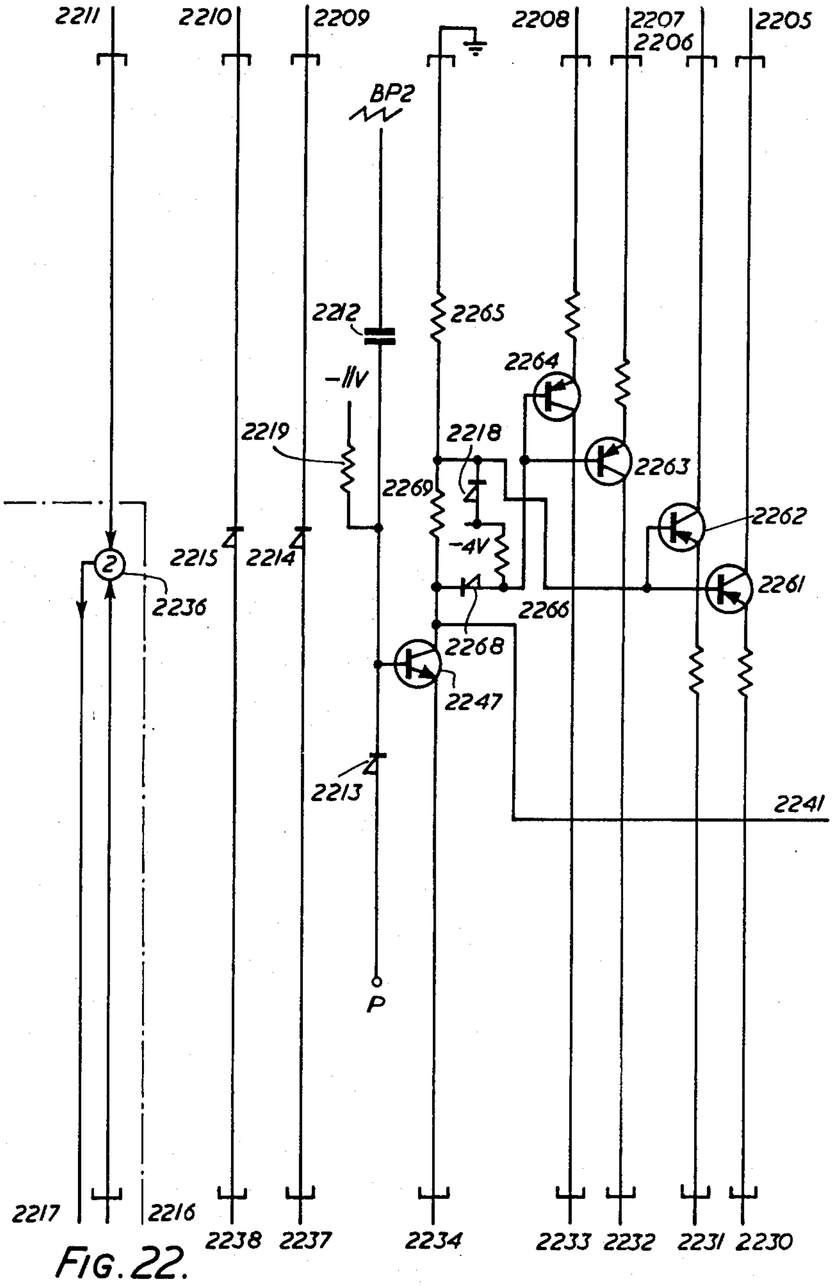
Figure 23:
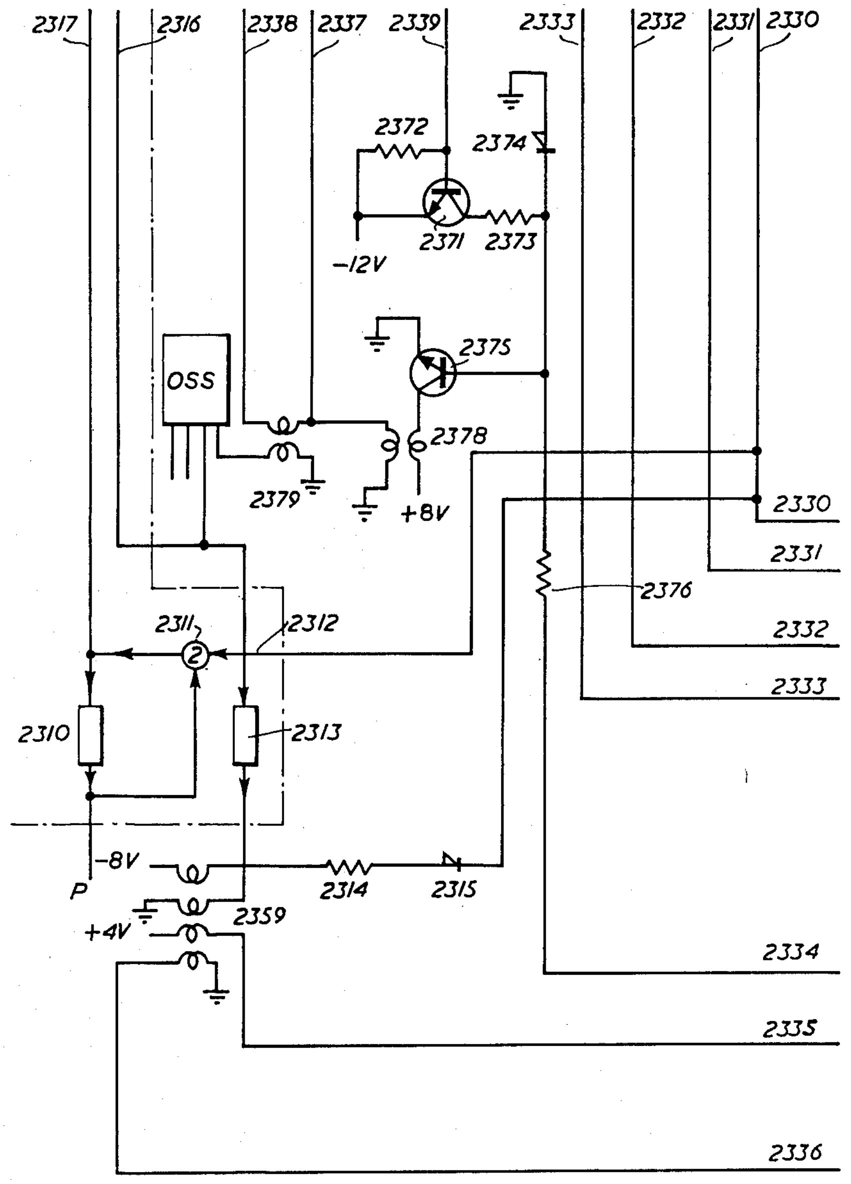
Figure 24:
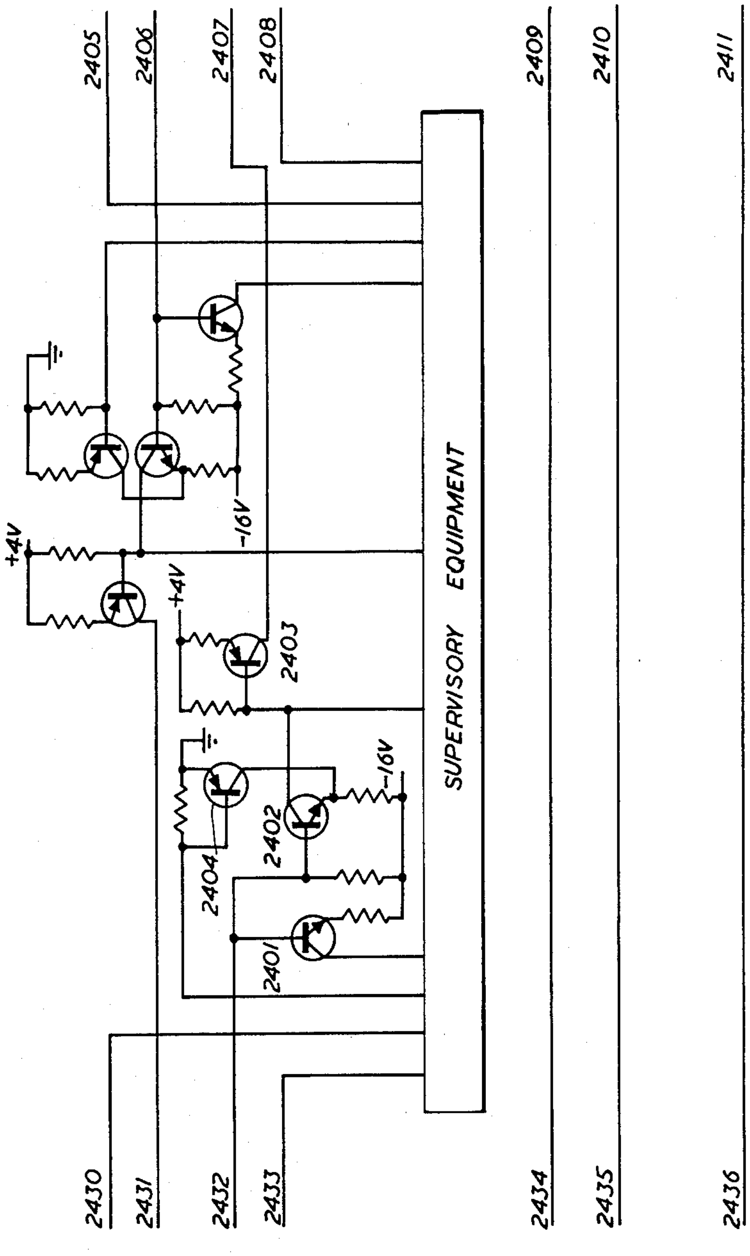

FIGURE 10 shows as much of an originating register as is necessary to the understanding of the invention. A register comprises a modulator diode 1010 which provides the holding signal to lead 1730 of the trunks until a release contact RC is operated when the register releases itself from the connection. A second modulator including diode 1011 provides pulses for the speech transmission path over leads 1031 and 1731 the pulses being modulated by audio frequencies e.g. dial and busy tones over lead 1012 in the register. These pulses have to be gated to occupy the latter part of the multiplex channel duration in order not to interfere with the speech signalling path which occupies the early part. For this reason, the signals on lead 1012 are applied via a capacitor 1013 to the base of a transistor 1014 biased by potentiometer resistors 1015, 1016, its collector circuit feeding the modulator diode 1011 and its emitter circuit including the resistor 1018 and transistor 1017 rendered conducting normally with its collector bottomed by the current into its base via a resistor connected to the bias poteniometer 1015, 1016. With transistor 1017 bottomed the transistor 1014 acts as an amplifier with a feedback resistor in the emitter circuit. With transistor 1017 non-conducting due to a BP3 pulse applied to its base via capacitor 1019 transistor 1014 is cut-off i.e. does not supply current during the signalling pulse time BP3. A demodulator 1020 terminates the incoming speech transmission path 1032 whereby D.C loop signals and A.C e.g. V.F. key sending signals can be received into the register. The demodulator filter terminating resistors in which the D.C. corresponding to the loop current appears are taken to the collector power supply via a relay A shunted with a capacitor to by-pass audio frequencies, whereby the loop signals from a subscriber's line connected over the switches to the register can be received to operate the register in known manner. A second demodulator 1021 is shown. This is simplified relative to the speech remodulator, the filter comprising only a capacitor 1022 and the output operating a relay in response to signals over the signal path if required. Thus, when a call is established from a subscriber's line to a register there are two paths in each direction of transmission for the operation of the register. Calls can be set up to registers during a block pulse B*px* when subscribers' lines are scanned for originating calls. A register when seized has its A relay operated as described and this operates a slow-to-release B relay as well-known in the art. If the B relay is not operated, the BP1 pulses are applied to the emitter of a transistor 1023 which is normally non-conducting but is made conducting by a block pulse BP*x'* applied to its base. During the block pulse and if the register is free i.e. B relay unoperated, BP1 pulses are transmitted by transistor 1023 and transformer 1024 over lead 1034 to the marking lead 1734 (FIGURE 17) of the register trunk as destination marking pulses. This is true of all registers. Marking pulses appear over the 1734 marking leads of all register trunks terminating in free registers. These are amplified by transistor 175 and communicated via transformer 178 and lead 1737 to lead 1637 (FIGURE 16) and via diodes 1614 of all cross-points to which the register trunks have access, and via lead 1609 to lead 834 (FIGURE 8) to the 734 leads of the trunks of the next switching stage where channel pulses already in use are suppressed by the conduction of transistors 71 the unsuppressed pulses being amplified by transistors 75 and so onwards to the end of the chain where at the ends of each of the last trunks (534 FIGURE 5) there appears all the free channel pulses by which a free register may be reached. The combination of one of these pulses with an originating marking pulse over transformer 559 has already been described, and results in a calling line being connected to a free register using the channel pulse permanently alloted to the line. A register when connected operates in known manner, e.g. it sends back dial tone and received number signals by dialling or V.F. key seeding and when it has received sufficient digits to set up a connection through the exchange it gains the exclusive use of the marker, the digits having been translated if necessary during their reception or by the marker when operated by the register. Let it be assumed that the call is to an outgoing junction. The register transmits number information to the marker which selects the required group of junctions by the operation for example of a route relay shown in FIGURE 12. The exchange apparatus now operates to make a connection from the register to a free outgoing junction in the selected group of outgoing junctions, the connection using the inter-switch trunk (10 in FIGURE 2) already in use. This connection is made from an out-going section of the register shown in FIGURE 9 as comprising modulator diode 1025 and modulator 1026, and demodulator 1027 which terminate two transmission paths in the direction from the register toward the outgoing junction and one transmission path in the reverse direction. These paths are carried through the register cross-point by transistors 917 to 919 FIGURE 9 respectively driven in parallel with the similar transistor of the transmission path to the subscriber. The first is an originating marking path. A contact 1029 FIGURE 10 in the register closes to mark the register as the one making the connection. The transistor 1028 is normally non-conducting due to bias applied to its base. It is made conducting during one selected multiplex group pulse *mGpy'*. The closing of the contact 1029 causes current to flow through the resistor 1035 and transistor 1028 when pulsed on its base to diode 1025, which current is directed on leads 1036 and 936 (FIGURE 9) through the transistor 917 when that transistor is pulsed. The second path carries D.C. signals from a contact 1037 (FIGURE 10) which closes at the same time as contact 1029 and audio frequency signals from a transformer 1039 via the modulator 1026 on leads 1038 and 938 (FIGURE 9) to transistor 918. The third path receives via transistor 919 (FIGURE 9) D.C. and audio frequency signals which via leads 940 and 1040 are demodulated by demodulator 1027 (FIGURE 10) and emitted to a relay R and lead 1041 respectively. Following the connections from the register (FIGURE 10) through the cross-point transistors, (FIGURE 9) to FIGURE 8 it will be seen that the originating marking path terminates on a transformer 859 similar to transformer 559 of FIGURE 5, and the other two paths are carried forward to the next switching stage and connected backward toward the originating subscribers line by diodes 81, 82 which with the polarities and potentials chosen are biased into the non-conducting state while the register is connected to the connection. Referring to FIGURE 12 which shows the out-going junction equipment, the route relay in the marker is shown within a chain-dotted line with a contact which is closed when the relay is operated to apply BP1 pulses to a lead which is common to all the junction equipments terminating junctions in the group indicated by the route relay. Within each junction equipment these pulses are applied to a transformer 1201 as terminating marking pulses unless disconnected by a contact on a B relay which is operated if the junction and its equipment are engaged. Next to FIGURE 8 taken in vertical order as shown in FIGURE 31 are FIGURES 18 and 19 representing the cross-points of switch 11 in FIGURE 2, FIGURE 11 representing the supervisory equipment of FIGURE 2, FIGURES 20 and 21 representing the cross-points 19 of FIGURE 2, and FIGURE 12 representing the outgoing junctions of FIGURE 2. Assembling the diagrams in that order it will be seen that the previously described conditions for a connection to be made now exist, with an originating marking pulse being sent out from the register once during the selector's *mGpy* pulse at the channel time of the originating subscriber's line and terminating marking pulses being applied from all free junctions on the selected route. First, a cross-point in switch 11 (FIGURE 2) is operated, then one in switch 19 (FIGURE 2). The D.C. signal over the path 1932 (FIGURE 19) when received into the supervisory euipment on lead 1132, (FIGURE 11) causes the supervisory equipment to apply a hold channel pulse signal on the lead 1130 back towards to the register, thus holding the connection back towards the subscriber and a hold channel pulse signal to the lead 1108 forward to the junction. A connection is thus established and held between the register and an outgoing junction, with a D.C. path controlled by contact 1037 (FIGURE 10) e.g. for dialing pulses and an A.C. path from transformer 1039 e.g. for A.C. key-sending pulses from modulator 1026 in the register to the junction and on similar paths from the junction to the register demodulator 1027 (FIGURE 10). Referring to FIGURE 12, signals over the first path mentioned are demodulated in the demodulator 1202, the D.C. signal controlling the relay A and the A.C. signal passing to a hybrid transformer 1203. Over the second path is passed A.C. signals from the hybrid transformer and a D.C. signal via a resistor 1205 both via a modulator 1204, these being demodulated in the register to give an A.C. output on lead 1041 and operate relay R (FIGURE 10) respectively. The operation of relay R is a signal to the register that a junction is connected and that it may release the marker and proceed with sending digits to the junction. The A relay in the junction equipment (FIGURE 12) operates as soon as the junction is seized from the register and it operates a slow to release B relay in the usual way, a contact on the B relay disconnecting the BP1 pulses from the transformer 1201 to mark the junction as busy. The secondary winding of the hybrid transformer 1203 is split by a capacitor across which a polarised relay D in series with a contact on the A relay is connected in known manner for the seizing of the junction represented by conductors 1207, 1208 by looping the conductors, and for receiving an answer signal by the reversal of the polarity of the junction conductors to operate the relay D. A contact on relay D when closed feeds currents to modulator diode 1206 and hence signals over lead 1230 to the supervisory equipment (FIGURE 11), that the call has been answered.

*Detailed description—Supervisory equipment*

Referring to FIG. 11, the supervisory equipment is shown as interposed in a trunk. It terminates the two incoming signalling paths 1133 and 1105, receiving signals over these paths to control further operations. It sends signals over the two signalling paths 1130 and 1108 and it can receive signals shunted from the speech transmission paths 1132, 1107 and 1106, 1131 and can interrupt these paths when necessary. Signals received over lead 1132 are repeated into the supervisory equipment by transistor circuit 1101 and normally by transistor circuit 1102 to a transistor circuit 1103 to the lead 1107. The transistor circuits 1102 and 1103 are amplifiers normally providing zero gain from input lead 1132 to output lead 1107 but also providing a change in datum potential to suit the cross-points on each side of the supervisory equipment. The supervisory equipment can interrupt the transmission path by causing the transistor 1104 to conduct to bias the emitter of the transistor of circuit 1102 to the non-conducting state. A similar transmission path from lead 1106 to lead 1131 can be traced on the figure. Supervisory equipment suitable to time-division multiplex trunks in telephone exchanges is known in the art and is not part of the present invention.

*Detailed description—Junction calls*

Figure 14:
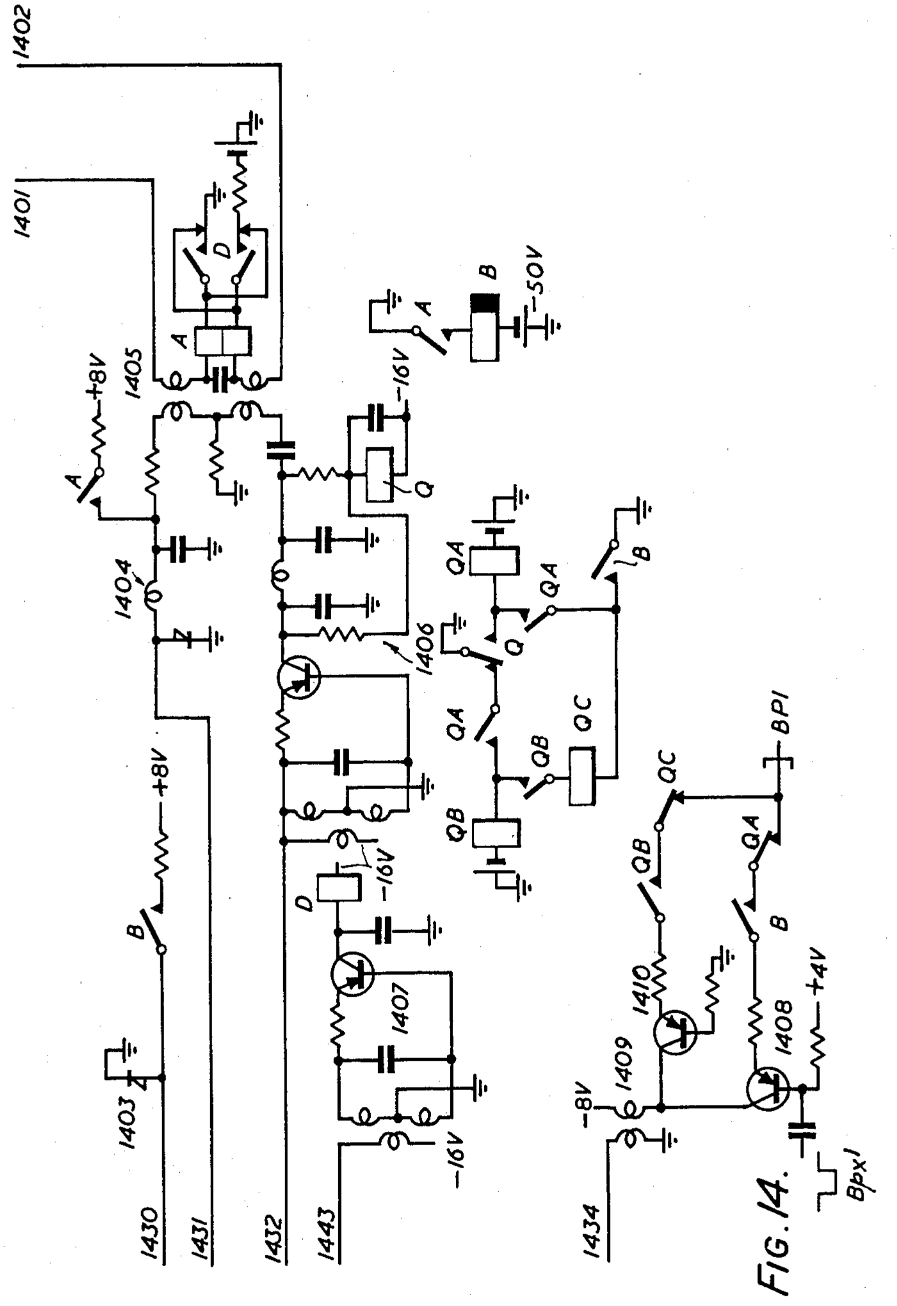
Figure 15:
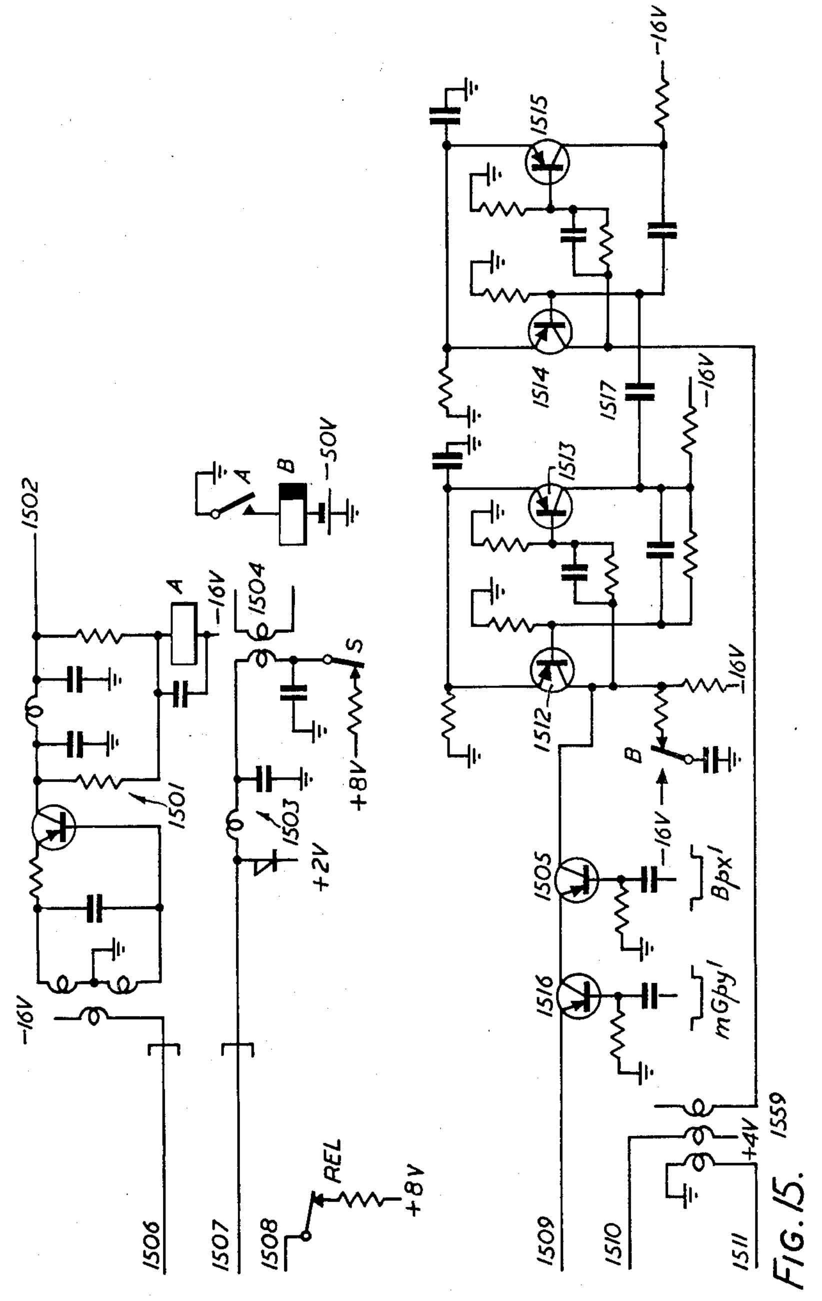
Figure 25:
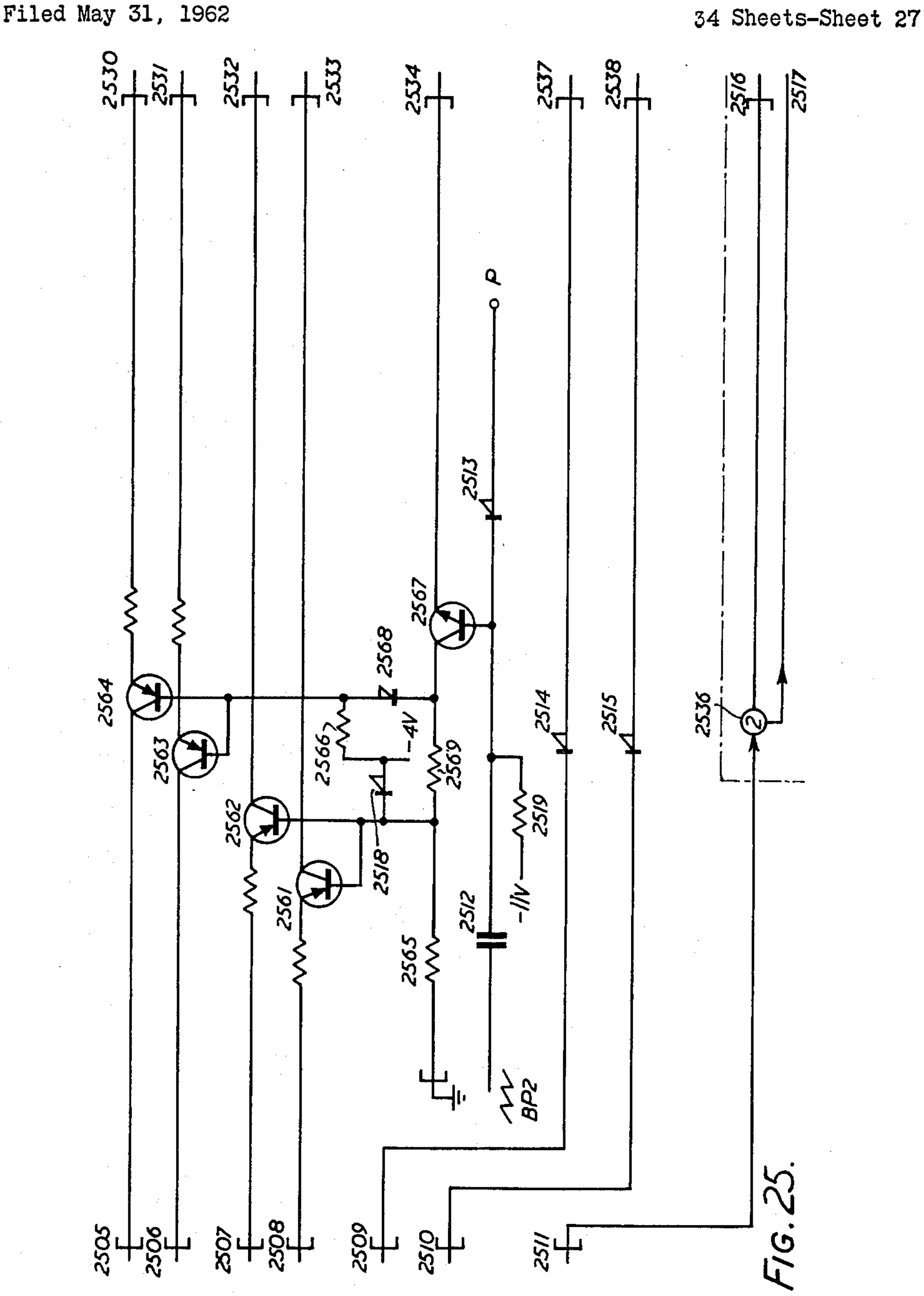
Figure 26:
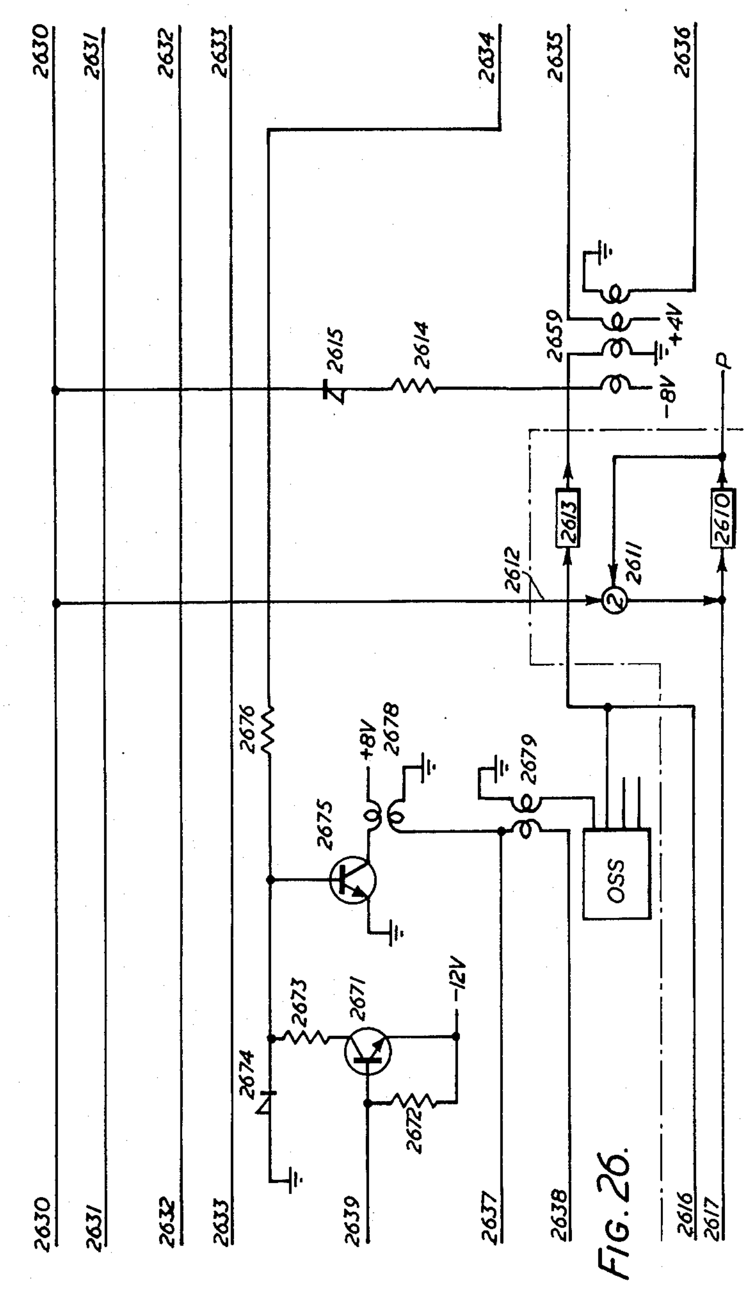
Figure 27:
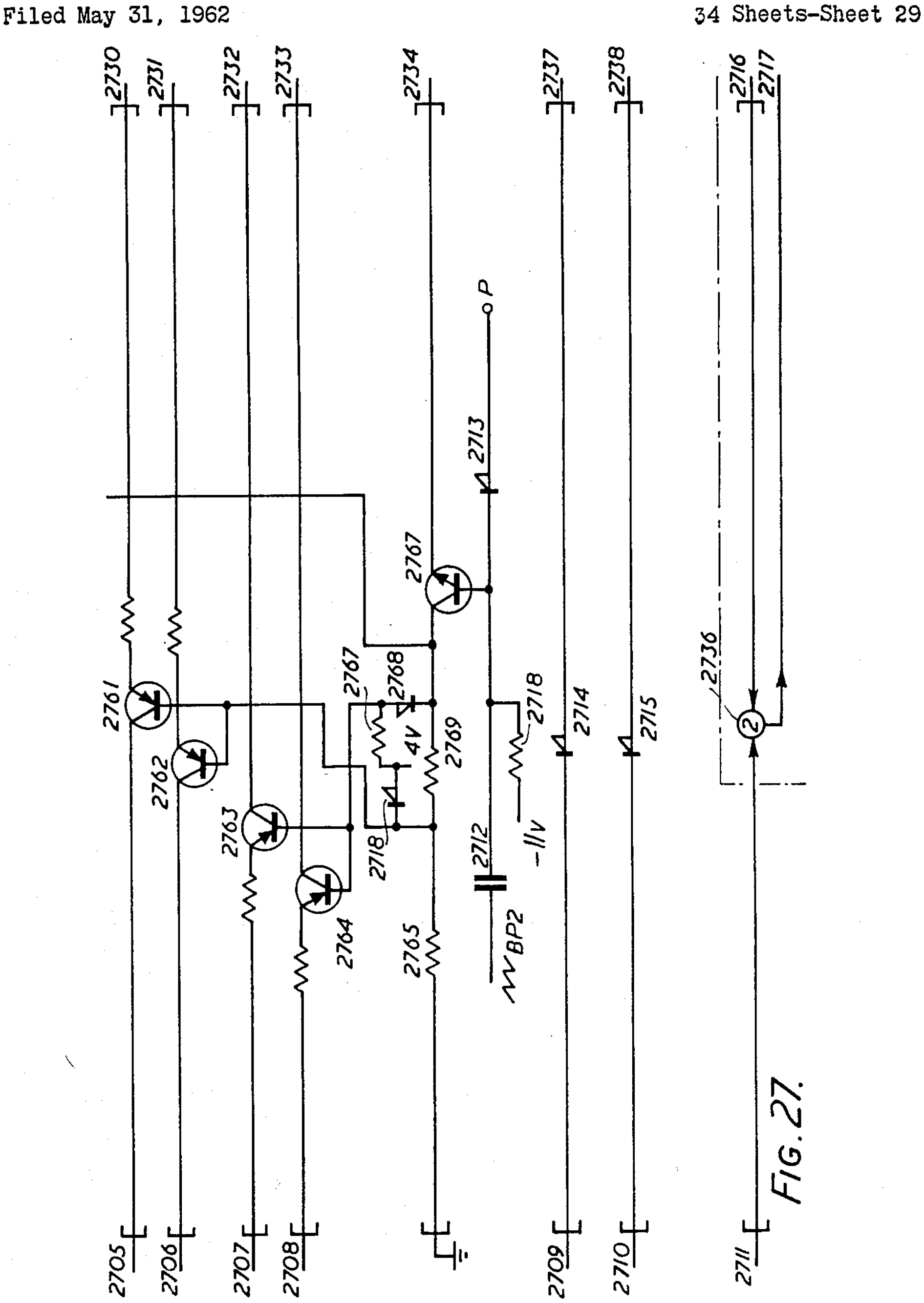
Figure 28:
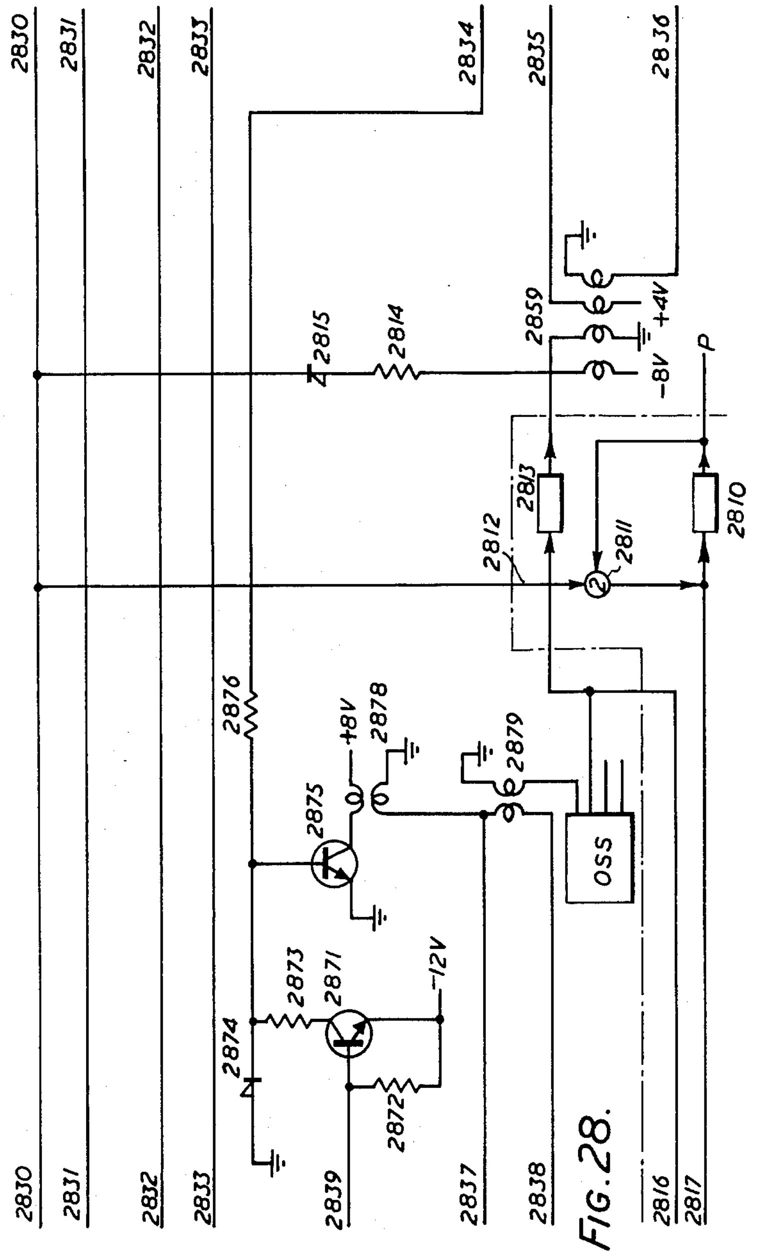
Figure 29:
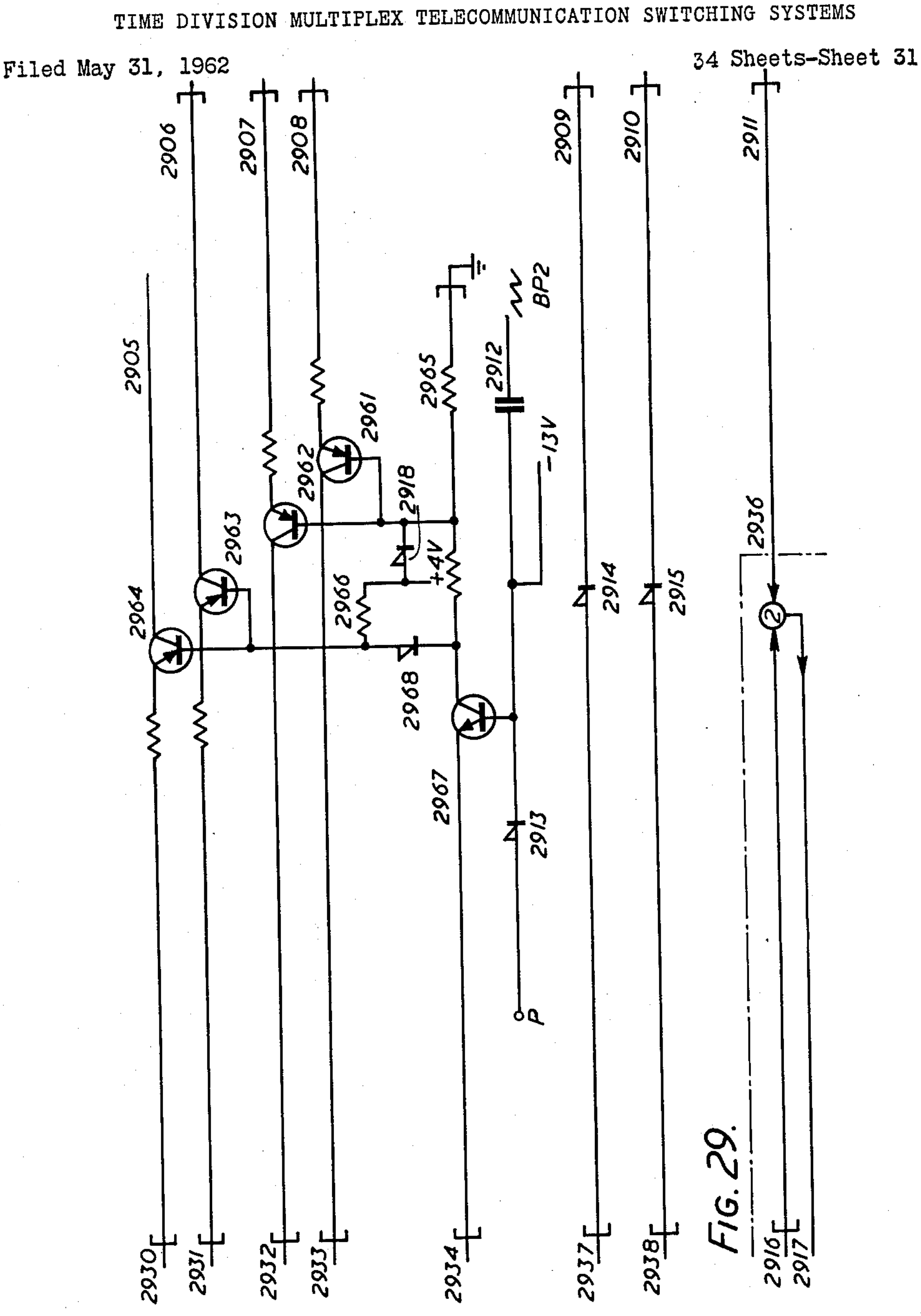
Figure 30:
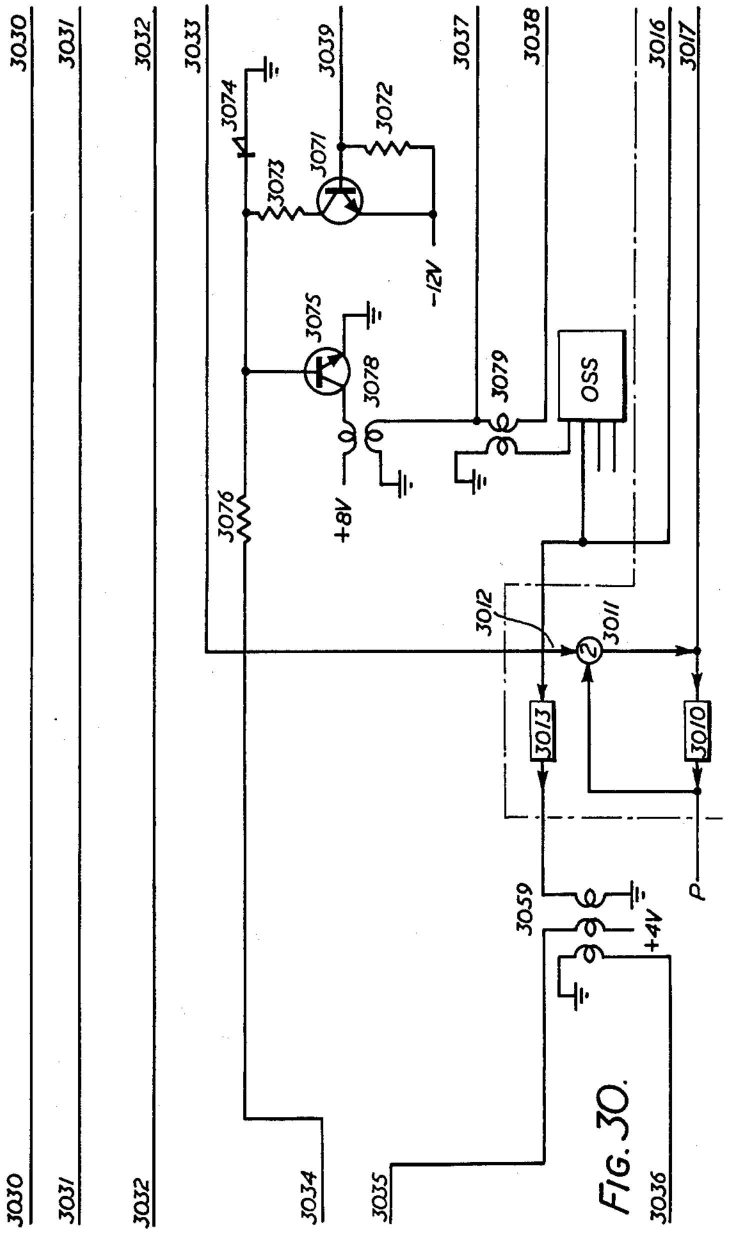

Turning now to incoming junction calls and referring to FIGURE 14 an incoming junction 1401, 1402 is terminated on equipment comprising two transmission paths in each direction of transmission through the exchange. One path includes the modulator 1403 transmitting D.C. forward hold signals from a B relay contact, a second path includes modulator 1404 transmitting D.C. signals from an A relay contact and A.C. signals from the transmit side of a hybrid transformer 1405, a third path includes a demodulator 1406 receiving D.C. signals to control a relay Q and A.C. signals which are applied to the transmit side of the hybrid transformer 1405 and a fourth path which includes the simplified demodulator 1407 which receives D.C. signals to control relay D. An incoming call starts with the junction wires 1401, 1402 being looped at the far end. Relay A at the centre of the split primary winding of the hybrid transformer operates to the loop, operates the slow-to release B relay which applied BP1 pulses to the emitter of a transistor 1408 normally biased beyond cut-off but made conducting by block pulses B*px'* to transmit the BP1 pulses to a transformer 1409 and a marking lead 1434. The pulses on lead 1434 are destination marking pulses. They can appear only during selected block pulses which may be the same as the block pulses controlling subscribers originating calls (B*px'* on FIGURE 5) because originating subscriber calls and originating junction calls do not mutually interfere. An incoming junction, when calling, needs to be connected to a terminating register as shown in FIGURE 2. The path between a terminating register (FIGURE 15) and an incoming junction (FIGURE 14) can be traced by assembling the intervening diagrams as shown in FIGURE 31. The path includes multiplex equipments (FIGURES 28, 26 and 30) and cross-points (FIGURES 27, 25 and 29) comprising the switches 17, 15 and 26 of FIGURE 2. Destination marking pulses applied as described will appear over leads 1509 (FIGURE 15) of every terminating register for which a free path exists between it and a calling incoming junction. As much of a terminating register as is necessary to the understanding of the invention is shown in FIGURE 15 to which reference is now made. The register comprises one transmission path for each direction of transmission through the switches. The receiving path 1506 includes demodulator 1501 which receives D.C. signals to operate relay A and A.C. signals which are communicated to lead 1502. The transmitting path 1507 includes modulator 1503 for transmitting D.C. signals controlled by a contact of a relay S the purpose of which is described later, and A.C. signals via a transformer 1504. A trigger circuit comprising the transistors 1512 and 1513 in its re-set condition has transistor 1513 conducting and 1512 non-conducting. This condition results from the release of the B relay and the charge on a capacitor connected by a released B relay contact to the collector circuit of the transistor 1512. A one-shot trigger circuit comprising transistors 1514 and 1515 is re-set with transistor 1515 conducting and transistor 1514 non-conducting. The first trigger circuit is set by current in the collector circuit of a transistor 1505. When set, the coupling via capacitor 1517 causes the second trigger circuit to set and a predetermined time substantially equal to the multiplex channel duration later it re-sets automatically. During the set time it transmits an originating marking pulse to transformer 1559 similar to the transformer 559 of FIGURE 5 and writes a pulse into an iterative store 3010 (FIGURE 30) of a selected cross-point forming part of switch 26 of FIGURE 2. Before this can happen however, the register must, first, be free which means the A and B relays released to re-set the trigger circuit, second, it must take place only during the selected block pulse B*px*, which transistor 1505 controls by being normally non-conducting and made conducting by the selected block pulses. Third, only one register at a time may be made available in order to avoid two registers becoming connected to the same call. This is controlled by transistor 1516 which is normally non-conducting but made conducting by a multiplex group pulse *m*G*py'*, each register using a different group pulse with a suitable interval between the group pulses used. A register being free and an incoming junction calling usually produces marking pulses over lead 1509 at many channel pulses any one of which is suitable for connection of the register. The first pulse to pass both transistors 1516 and 1505 operates both trigger circuits as previously described to send an originating marking pulse into transformer 1559. Assembling the figures as shown in FIG. 31 and from the description previously given it will be seen that a connection results between an incoming junction and a terminating register using the channel pulse which operates the trigger circuits in the register. The connection having been established the D.C. signal over lead 1507 from modulator 1503 in the register is received via leads 2907, 2932, 3032, 1307, 2507, 2532, 2632, 2707, 2732, 2832, and 1432 by the demodulator 1406 in FIGURE 14 in the junction to operate relays Q and QA which removes the marking pulses BP1 from the marking lead 1434. The interval between multiplex group pulses applied to different registers should be long enough to cover the operation of the Q and QA relays in a connected junction equipment. The register (FIGURE 15) receives number signals from the junction and when it has received all of them to define a called directory number it gains access to the marker in known manner and transmits the directory number to the marker. The operation now required is to connect a free line having this directory number to the incoming junction making the call. To do this the register must mark the junction concerned which it does by opening contact S (FIGURE 15), which via lead 1507 releases relay Q in the junction equipment (FIGURE 14) to which it is connected. Referring to FIGURE 14, relay Q in operating operated relay QA which locked. The release of relay Q operates relay QB which applies BP1 pulses via a transistor 1410 which is made non-conducting by block pulses B*px'* which make transistor 1408 conducting. When the transistor 1410 is conducting it communicates terminating marking pulses via contacts QB and QC to the transformer 1409 and to lead 1434. The register sends the directory number to the marker and thereby marks a terminal $t_d$ (FIGURE 5) at the beginning of a block pulse which is not a block pulse used for scanning subscribers' lines for new calls. Marking the terminal $t_d$ results in all lines with the specified directory number producing originating marking pulses in a preferred order as already described. Assembling the figures as shown in FIGURE 31 and from the description already given it will be seen that the first free line with the specified directory number and a free path to the marked incoming junction will be connected through the switches to the incoming junction. The register (FIGURE 15) then releases itself by operating relay REL which stops the circulation of the store 3010 and the pulsing of the register cross-point. The release of the register puts the outward speech path and relay Q in the junction equipment (FIGURE 14) under the control of the supervisory unit which sends out a D.C. signal to operate relay Q. Relay Q operating allows relay QC to operate to remove the terminating marking pulses from the marking lead 1434 in the junction equipment. The answering loop signal of the called line is detected by the supervisory unit (FIGURE 11) and re-transmitted to operate relay Q in the junction equipment (FIGURE 14) to reverse the polarity of the lines 1401, 1402 in known manner.

*Detailed description—Local calls*

Local calls between subscribers' lines on the same exchange are set up via audio links (22 in FIGURE 2) which operate in a manner similar to outgoing junction circuits as described connected to incoming junction circuits as described. The originating register in setting up the call connects via cross-point 23 (FIGURE 2) to an audio link marked by the marker which, when connected, starts an incoming call to a terminating register via cross-point 23 (FIGURE 2). The originating register then transmits the called number to the terminating register which completes the connection in a manner similar to the operation of an incoming junction.

*Detailed description—Selector*

FIGURE 32 shows a one-only selector designed to select one out of eight trunks providing inputs (as from transformers 79 in FIGURE 7 or equivalent figures) on leads 3201, 3203, 3205, 3207, . . . 3215 to receive an output (to gate 636 and store 710 FIGURES 6 and 7) on one of the leads 3202, 3204, 3206, 3208, . . . 3216 respectively for each of the inputs. The one-only selector comprises rectangular hysteresis magnetic cores in a co-ordinate array of rows and columns the cores, for example C21 to C28 for the 2nd row, being normally biased to an arbitrary 0 condition by row bias current from a battery through a resistor R2 and a winding on each core in the row then via a diode D2 to the secondary winding of a transformer T2. Bias current flows via the transformer secondary winding, the diode windings of the cores and the resistor to battery except when the primary of the transformer is pulsed with an S*p* pulse when the diode is biased in the direction of low conduction and the current from the battery is momentarily diverted into a capacitor shunting the circuit at the junction of the resistor and the core windings. Bias current is removed one row at a time by the S*p* pulses. The direction of the windings is indicated by the spot convention in which current into a winding at the end indicated by a spot tends to set the core to the arbitrary 1 condition. Two further windings on each core are connected in columns, one winding in a column being connected to an input lead, and one to an output lead. Current entering an input lead tends to drive all the cores in the column to which it is connected to the arbitrary 1 condition. Any core so driven induces a voltage into its output winding and thus selects one of the trunks. Bias current is arranged always to exceed input current. Thus when an input occurs only the cores in the row from which bias current has been removed can be driven to the 1 condition and only one of these can be so driven because of the effect of further windings on the cores which will now be explained. The further windings are in series with the input lead column windings and wound so that current from an input lead and through a further winding biases the core on which the winding is made to the arbitrary 0 condition with a magneto-motive force sufficient to prevent the core from being driven to the 1 condition by the current in its input column winding. The further windings could, alternatively be parallel connected with the appropriate input lead 3. The further windings on a given row of cores are arranged and connected so that a core in one first column is biased by current in any other column, a core in a second column is biased by current in any column other than the first and second column, a core in a third column is biased by current in any column other than the first, second and third and so on. In the first row of FIGURE 32 for example, it can be traced that core C18 is biased to the 0 condition by current in inputs 3201, 3203, 3205, . . . 3215, core C13 is biased by current in inputs 3201, 3203, core C12 by current in input 3201 and C11 is not biased by any input current. Hence input 3201 takes precedence over all others, input 3203 over all but 3201, 3205, over all but 3201 and 3203, and 3207 over none. The first row is therefore a one-only selector for which the order of selection for any combination of inputs on the input leads is 3201, 3203, 3205, 3207, . . . 3215, and indicated by an output on the corresponding lead 3202, 3204, 3206, 3208, . . . 3216. The order of selection is made different for each row. It can be traced from the figure that the order of selection of the second; third and fourth rows is 3203, 3205, 3207, 3209, 3211, 3213, 3215, 3201, 3205, 3207, 3209, 3211, 3213, 3215, 3201, 3203, and 3207, 3209, 3211, 3213, 3215, 3201, 3203, 3205 respectively. The rows are selected in order in a cycle which presents a row for each multiplex channel pulse. Preferably the number of channel pulses in the cycle is prime to the number of channel pulses in the multiplex whereby the association of rows of cores and multiplex channels has an element of randomness. In the example in FIGURE 32, the rows of cores are selected by the S*p* pulses applied to the transformers T1 . . . T8. There are seven S*p* pulses, seven being prime to an assumed 30 channels in the multiplex, the seven pulses being distributed over the eight rows. Clearly any number of rows can be used up to the number of S*p* pulses. Any number of columns can be used up to the practical limits of the number of winds, which can be put on any one core, which limit largely depends on the size of the core and can be made large if necessary by using large cores.

The operation of the one-only selector starts with all cores being in the arbitrary 0 condition induced by row bias current. During each multiplex channel time row bias is removed from one row by an S*p* pulse operating on the transformer of the row. If during a channel pulse time inputs occur on one or more of the input leads, one core in the row will be changed to the 1 condition to induce an output pulse into one and only one output lead corresponding to one of the inputs. At the end of the channel pulse time the one core will be restored to the 0 condition by the returning row bias.

In the foregoing description the BP1 pulses are used as terminal marking pulses. Alternating voltage pulses are used to produce currents in the various marking leads which can be passed by transformers in the marking paths. Continuous terminal marking can be used if desired, making the transformers unnecessary. However escalating voltages between switching stages are necessary to the D.C. operation of the transistors and this is usually less desirable than the transformers of the A.C. marking arrangement which has been described.

*Detailed description—Block pulses*

The use and arrangement of the block pulses can now be described in more detail. It will be appreciated from the foregoing description that the different types of connexion which can be made include:

(1) Calling subscriber's line to originating register
(2) Originating register to outgoing junction
(3) Incoming junction to terminating register
(4) Incoming junction with terminating register connected to a called subscriber's line.

It will be further appreciated that connexions (1), (2) and (3) do not mutually interfere with one another but (4) uses the same marking paths as (1) and (3) and hence would interfere with them. The primary object of block pulses is to prevent interference. A block pulse duration is at least equal to and usually slightly exceeds the scanning time of a block of subscriber's lines. 1500 lines is a convenient block which with the scanning times assumed in the examples above are scanned in 5 m./secs. In one practical arrangement alternate block times are allocated as follows:

Even blocks—subscriber line scanning and incoming junction connexions to terminating registers.

Odd blocks—incoming junction to called subscriber connexion.

The even blocks are further allocated in rotation to blocks of subscribers' lines. In a large exchange with say ten blocks of lines each block is scanned for subscribers' originating calls ten times per second which is fast enough. The even blocks are also allocated in turn to each terminating register (FIGURE 15, block pulse BP*x'* to transistor 1505) so each register is presented in turn for new incoming junction calls and double connexions to terminating registers avoided. The multiplex group pulse *m*G*py* to transistor 1516 in FIGURE 15 is preferably in the first half of the block pulse to give selection time to take place and busy a calling incoming junction before the next block pulse and register is presented. The number of terminating registers usually exceeds the numbers of blocks of blocks of subscribers' pulses hence there are more register block pulses than subscribrs' blocks. The subscribers' blocks can then be given more than one block pulse still substantially maintaining the ordered sequence of block scanning within a given cycle time. The odd blocks are also allocated in turn to terminating registers for the setting up of calls to called subscribers' lines, thereby ensuring that no two registers try to set up calls simultaneously. The originating registers are similarly allocated individual block pulses during which they can set up calls to outgoing junctions without interference between registers.

In the figures given to illustrate the example chosen voltages and polarities are marked by way of example and to help in the understanding of the circuit operation. These will be understood by those skilled in the art and for this reason are not mentioned in the text.

*Miscellaneous*

The FIGURES 5 to 31 illustrate the trunking arrangement shown in FIGURE 2. It will be appreciated however from the descriptions given that the stage by stage selection system disclosed is applicable to any numbers of stages and that in consequence trunking arrangements may be chosen without restriction to suit individual exchanges and are not limited to that shown in FIGURE 2.

Although in the embodiment described above, pulse amplitude modulation has been used, it will be understood that other forms of modulation, for example pulse code modulation, may be used.

The embodiment described above employs 2 wire–4 wire transmission techniques but it will be appreciated that the system may be entirely 2 wire. A 2 wire system is similar to the embodiment described above except that the OUT highways indicated by dotted lines are not needed and appropriate terminating apparatus is used.

I claim:

1. A time division multiplex communication system comprising in combination a plurality of rows of circuits, a first time division multiplex bothway communication highway for each row, line equipment connecting each circuit of a row to the first highway of the row, a plurality of second time division multiplex bothway communication highways, a first group of electronically-controlled crosspoint switches interconnecting each first highway with some at least of the second highways, a group of terminating time division multiplex bothway communication highways, a second group of electronically-controlled crosspoint switches interconnecting each second highway with some at least of the terminating highways, a plurality of incoming junction lines, line equipments connecting the incoming junction lines to said terminating highways, a group of originating time division multiplex bothway communication highways, a third group of electronically-controlled crosspoint switches interconnecting each second highway with some at least of said originating highways, a group of outgoing junction lines, line equipments interconnecting said outgoing junction lines with said originating highways, a plurality of audio circuits and line equipments connecting each of said audio circuits with said originating and said terminating highways.

2. A time division multiplex communication systems as claimed in claim 1 and further comprising means for alloting to each circuit of a row a fixed one of the channels on the first highway of the row.

3. A time division multiplex communication system as claimed in claim 1 and further comprising, for each of said first, second and third groups of crosspoint switches, a circuit for determining which channels on highways interconnected by the crosspoint switches are available for use and a selection circuit for selecting and indicating one of those channels and the crosspoint switch interconnecting the highways and including the selected and indicated channel.

4. A time division multiplex communication system as claimed in claim 3 and further comprising interconnecting circuits between the determining circuit of said second group of crosspoint switches and the determining circuit of said first group of crosspoint switches and between the determining circuit of said third group of crosspoint switches and the determining circuit of said first group of crosspoint switches whereby channels available for use at said second and third crosspoint switches are indicated to the determining circuit of said first group of crosspoint switches where a comparison is made with those channels in use at said first group of crosspoint switches whose determining circuit selects those channels mutually free.

5. A time division multiplex communication system as claimed in claim 1 and further comprising a pulse train generating system common to said first, second and third groups of crosspoint switches and means for supplying pulse trains generated by said system to said switches.

6. A time division multiplex communication system as claimed in claim 1 and further comprising, for each of said first, second and third groups of crosspoint switches, a pulse train generating system and means for supplying pulses generated by the system to the crosspoint switches of the group of crosspoint switches.

7. A time division multiplex communication system as claimed in claim 1 and further comprising a plurality of originating and terminating registers and interconnections from said originating registers to said second highways and from said terminating registers to said terminating highways.

8. A time division multiplex communication system as claimed in claim 1 and further comprising in said line equipments connecting said incoming junction lines, a plurality of crosspoint switches each operable to connect one of the junctions with one channel on one of said terminating highways.

9. A time division multiplex communication system as claimed in claim 8 and further comprising in said line equipments connecting said outgoing junctions with said originating highways, a plurality of crosspoint switches each operable to connect one of said junctions with one channel on one of said originating highways.

10. A time division multiplex communicating system as claimed in claim 8 and further comprising, connected between said plurality of crosspoint switches and said terminating highways, a fourth group of electronically-controlled crosspoint switches connecting each of said terminating highways with some at least of a further group of highways outgoing from said plurality of crosspoint switches.

11. A time division multiplex communication system as claimed in claim 1 and further comprising in said line equipments interconnecting said audio circuits to said originating and terminating highways groups of crosspoint switches each operable to connect one of said audio circuits with one channel on an originating highway and one channel on a terminating highway.

12. A time division multiplex communication system as claimed in claim 2 in which said circuits are scanned periodically, each circuit with which connection is to be made being identified by the transmission of a pulse at the channel time of the circuit.

13. A time division multiplex communication system as claimed in claim 12 in which said circuits are, for scanning purposes, divided into blocks, each block being identified by a block pulse train, each circuit of a block being identified by a pulse coincident with the channel time of the circuit and the block pulse of the block containing the circuit, the channel times of the circuits within a block being synchronised with those of circuits in other blocks.

14. A time division multiplex communication system as claimed in claim 13 in which said circuits are arranged within a block in the order in which they are required to be scanned.

15. A time division multiplex communication system as claimed in claim 1 and further comprising for each first highway, each second highway, each terminating highway and each originating highway, a separate signalling highway, the signalling highways being interconnected at crosspoints corresponding with the crosspoints interconnecting the first, second, terminating and originating highways.

References Cited by the Examiner

UNITED STATES PATENTS

| | | | |
|---|---|---|---|
| 2,910,541 | 10/59 | Harris | 179—15 |
| 2,917,583 | 12/59 | Burton et al. | 179—15 |
| 3,049,593 | 8/62 | Touraton et al. | 179—15 |

DAVID G. REDINBAUGH, *Primary Examiner.*